(12) United States Patent
Kramer et al.

(10) Patent No.: US 8,829,122 B2
(45) Date of Patent: Sep. 9, 2014

(54) POLYURETHANE POLYMER BASED ON AN AMPHIPHILIC BLOCK COPOLYMER AND ITS USE AS IMPACT MODIFIER

(75) Inventors: Andreas Kramer, Zurich (CH); Jurgen Finter, Zurich (CH); Karsten Frick, Remetschwil (CH); Jan Olaf Schulenburg, Uster (CH)

(73) Assignee: Sika Technology AG, Baar (CH)

( * ) Notice: Subject to any disclaimer, the term of this patent is extended or adjusted under 35 U.S.C. 154(b) by 478 days.

(21) Appl. No.: 12/937,087

(22) PCT Filed: Apr. 16, 2009

(86) PCT No.: PCT/EP2009/054546
§ 371 (c)(1),
(2), (4) Date: Oct. 8, 2010

(87) PCT Pub. No.: WO2009/127699
PCT Pub. Date: Oct. 22, 2009

(65) Prior Publication Data
US 2011/0030893 A1 Feb. 10, 2011

(30) Foreign Application Priority Data

Apr. 16, 2008 (EP) .................................... 08154634

(51) Int. Cl.
| | | |
|---|---|---|
| C08G 71/04 | (2006.01) | |
| C08L 53/00 | (2006.01) | |
| B32B 37/12 | (2006.01) | |
| C08G 18/40 | (2006.01) | |
| C08G 18/80 | (2006.01) | |
| C08G 18/10 | (2006.01) | |
| C08G 18/28 | (2006.01) | |
| C08L 63/00 | (2006.01) | |
| C08G 59/40 | (2006.01) | |
| C08G 18/75 | (2006.01) | |
| C08G 18/67 | (2006.01) | |
| C08G 18/48 | (2006.01) | |
| C09J 163/00 | (2006.01) | |
| C08L 75/08 | (2006.01) | |
| C08K 3/00 | (2006.01) | |
| C08K 5/00 | (2006.01) | |
| C08L 75/04 | (2006.01) | |

(52) U.S. Cl.
CPC ........... C09J 163/00 (2013.01); C08G 18/4018 (2013.01); C08G 18/808 (2013.01); C08G 18/10 (2013.01); C08G 18/2865 (2013.01); C08L 75/08 (2013.01); C08L 2205/03 (2013.01); C08K 3/0033 (2013.01); C08L 63/00 (2013.01); C08G 59/4021 (2013.01); C08K 5/0016 (2013.01); C08G 18/755 (2013.01); C08G 18/6715 (2013.01); C08G 18/4866 (2013.01); C08L 75/04 (2013.01)
USPC .............................. 525/455; 525/460; 528/76

(58) Field of Classification Search
USPC ..................... 525/460, 455; 528/76
See application file for complete search history.

(56) References Cited

U.S. PATENT DOCUMENTS

| | | | | |
|---|---|---|---|---|
| 3,899,623 | A | * | 8/1975 | Okazaki et al. ............... 442/104 |
| 4,487,854 | A | * | 12/1984 | Hartman ........................ 521/174 |
| 4,888,389 | A | * | 12/1989 | Kennedy et al. ............... 525/131 |
| 5,162,387 | A | * | 11/1992 | Abel et al. ..................... 521/156 |
| 5,510,432 | A | * | 4/1996 | Schmalstieg et al. ......... 525/528 |
| 5,668,227 | A | | 9/1997 | Wolleb et al. |
| 5,707,439 | A | | 1/1998 | Takekoshi et al. |
| 5,859,075 | A | * | 1/1999 | Shukla et al. .................. 521/56 |
| 6,103,850 | A | * | 8/2000 | Reichel et al. ................. 528/60 |
| 6,197,849 | B1 | | 3/2001 | Zilg et al. |
| 6,322,890 | B1 | | 11/2001 | Barron et al. |
| 6,977,279 | B1 | | 12/2005 | Tillack et al. |
| 7,001,972 | B1 | | 2/2006 | Tillack et al. |
| 7,715,922 | B1 | * | 5/2010 | Tan ................................ 607/116 |
| 2002/0061941 | A1 | * | 5/2002 | Masamune et al. ........... 523/404 |
| 2003/0187136 | A1 | * | 10/2003 | Maier et al. .................... 525/63 |
| 2008/0076886 | A1 | * | 3/2008 | Burns et al. ................... 525/540 |

FOREIGN PATENT DOCUMENTS

| | | |
|---|---|---|
| DE | 2 123 033 | 8/1972 |
| DE | 199 35 325 A1 | 2/2001 |
| DE | 199 35 329 A1 | 2/2001 |
| EP | 0 308 664 A1 | 3/1989 |
| EP | 0 338 985 A2 | 10/1989 |
| EP | 0 353 190 A2 | 1/1990 |
| EP | 0 499 053 A2 | 8/1992 |
| EP | 0 610 068 A2 | 8/1994 |
| EP | 0 688 803 A1 | 12/1995 |
| EP | 1 152 019 A1 | 11/2001 |
| EP | 1 728 825 A1 | 12/2006 |
| JP | A-06-184266 | 7/1994 |
| WO | WO 89/08671 A1 | 9/1989 |

(Continued)

OTHER PUBLICATIONS

Hermel-Davidock et al., "Control of the Block Copolymer Morphology in Templated Epoxy Thermosets," Journal of Polymer Science: Part B: Polymer Physics, 2007, vol. 45, pp. 3338-3348.

International Search Report issued in International Application No. PCT/EP2009/054546 mailed on Jul. 13, 2009 (with English-language Translation).

International Preliminary Report of Patentability issued in International Application No. PCT/EP2009/054546 issued on Nov. 9, 2010.

Written Opinion of the International Searching Authority issued in International Application No. PCT/EP2009/054546 mailed on Jul. 13, 2009.

(Continued)

*Primary Examiner* — Mike M Dollinger
(74) *Attorney, Agent, or Firm* — Oliff PLC

(57) ABSTRACT

Novel impact strength modifiers which are obtained by reaction of amphiphilic block copolymers. These impact strength modifiers are suitable in particular for use in heat-curing epoxy resin adhesives. In particular, combinations of different impact strength modifiers are also suitable for use in heat-curing epoxy resin adhesives. Also disclosed are methods of bonding heat-stable substrates.

6 Claims, No Drawings

(56) References Cited

FOREIGN PATENT DOCUMENTS

| WO | WO 00/20483 A1 | 4/2000 |
|---|---|---|
| WO | WO 01/94492 A1 | 12/2001 |
| WO | WO 02/12364 A2 | 2/2002 |
| WO | WO 03/078163 A1 | 9/2003 |
| WO | WO 03/080693 A2 | 10/2003 |
| WO | WO 03/093387 A1 | 11/2003 |
| WO | WO 2004/055092 A1 | 7/2004 |
| WO | WO 2005/007720 A1 | 1/2005 |
| WO | WO 2005/007766 A1 | 1/2005 |
| WO | WO 2005/097893 A1 | 10/2005 |
| WO | WO 2006/052725 A1 | 5/2006 |
| WO | WO 2006/052726 A1 | 5/2006 |
| WO | WO 2006/052727 A1 | 5/2006 |
| WO | WO 2006/052728 A1 | 5/2006 |
| WO | WO 2006/052729 A1 | 5/2006 |
| WO | WO 2006/052730 A1 | 5/2006 |
| WO | WO 2007/020266 A1 | 2/2007 |
| WO | WO 2007/025007 A1 | 3/2007 |
| WO | WO 2008/016889 A1 | 2/2008 |
| WO | WO 2008/038257 A2 | 4/2008 |

OTHER PUBLICATIONS

Hillmyer et al., "Synthesis and Characterization of Model Polyalkane-Poly(ethylene oxide) Block Copolymers," Macromolecules, American Chemical Society, vol. 29, pp. 6994-7002, 1996.

Grubbs et al., "Reactive Block Copolymers for Modification of Thermosetting Epoxy," Macromolecules, American Chemical Society, vol. 33, pp. 9522-9534, 2000.

Wicks et al., "Blocked Isocyanates III: Part B: Uses and Applications of Blocked Isocyanates," Progress in Organic Coatings, vol. 41, pp. 1-83, 2001.

Wicks et al., "Blocked Isocyanates III: Part A: Mechanisms and Chemistry," Progress in Organic Coatings, vol. 36, pp. 148-172, 1999.

\* cited by examiner

POLYURETHANE POLYMER BASED ON AN AMPHIPHILIC BLOCK COPOLYMER AND ITS USE AS IMPACT MODIFIER

TECHNICAL FIELD

The invention relates to the field of impact strength modifiers and the field of heat-curing epoxy resin compositions.

STATE OF THE ART

Impact strength modifiers have been used for a long time to improve the strength of adhesives against impact forces. In particular, generally epoxy resin compositions indeed have high mechanical strength but are very brittle, i.e., the cured epoxy resin fractures under impact forces such as occur, for example, in vehicle collisions.

It was suggested long ago to improve impact strength by using impact strength modifiers.

Liquid rubbers have been used for quite some time for toughness modification. For example, liquid rubbers based on acrylonitrile/butadiene copolymers, such as are available under the name Hypro™ (formerly Hycar®), for example, have been used.

EP 0 338 985 A2 describes impact-resistant epoxy resin compositions which additionally have, besides liquid rubbers based on acrylonitrile/butadiene copolymers, also liquid rubbers based on polyurethane prepolymers terminated with a phenol or a lactam.

WO 2005/007766 A1 discloses epoxy resin compositions containing a reaction product between an isocyanate group-terminated prepolymer and a blocking agent, which is selected from the group bisphenol, phenol, benzyl alcohol, aminophenol, or benzylamine.

Such epoxy resin compositions, however, exhibit poor low-temperature impact strength (<0° C.).

WO 03/093387 A1 discloses impact-resistant epoxy resin compositions which contain adducts of dicarboxylic acids with glycidyl ethers or adducts of bis(aminophenyl)sulfone isomers or aromatic alcohols with glycidyl ethers. These compositions, however, likewise have poor low-temperature impact resistance (<0° C.).

A short time ago, for example, in WO 2006/052725 A1, WO 2006/052726 A1, WO 2006/052727 A1, WO 2006/052728 A1, WO 2006/052729 A1, WO 2006/052730 A1, and WO 2005/097893 A1, it was proposed to use amphiphilic block copolymers for epoxy resin compositions.

But it has been shown that although these impact strength modifiers do indeed have an effect, the increase in impact strength, in particular the low-temperature impact strength, is still unsatisfactory.

DESCRIPTION OF THE INVENTION

The aim of the present invention is to provide new impact strength modifiers that improve impact strength, in particular at low temperatures.

It has now surprisingly been discovered that this aim can be achieved by means of impact strength modifiers as specified in claim 1.

It has been discovered that these impact strength modifiers are most suited for use in heat-curing epoxy resin adhesives. It has been shown in particular that combinations of different impact strength modifiers according to the invention with each other and/or with other impact strength modifiers are especially advantageous. It has been shown that the glass transition temperature (Tg) of the cured matrix is not negatively affected or is not substantially negatively affected by the use of impact strength modifiers. Glass transition temperatures above 100° C. can be achieved with epoxy resins without any problem, and sometimes even above 100° C.

Further aspects of the present invention are the subject matter of other independent claims. Especially preferred embodiments are the subject matter of the dependent claims.

EMBODIMENTS OF THE INVENTION

The present invention relates in a first aspect to an impact strength modifier which is a polyurethane polymer PU1 having isocyanate groups or a reaction product PU2 between this polyurethane product PU1 and at least one NCO-reactive compound. The polyurethane polymer PU1 having isocyanate groups here is synthesized from at least one polyisocyanate and at least one amphiphilic block copolymer having at least one hydroxyl group, and optionally at least one compound with at least two NCO-reactive groups.

In this entire text, the prefix "poly" in "polyisocyanate," "polyol," "polyphenol", and "polymercaptan" indicates molecules that formally contain two or more of the respective functional groups.

"Impact strength modifier" in this document means an additive to a plastic matrix, in particular an epoxy resin matrix that, even for small additions, in particular additions of 0.1-35 wt. %, preferably 0.5-15 wt. %, causes a definite increase in toughness of the cured matrix, and thus higher bending, tensile, shock, or impact stresses can be withstood before the matrix cracks or fractures.

"Amphiphilic block copolymer" in this document means a copolymer which contains at least one block segment miscible with epoxy resin and at least one block segment immiscible with epoxy resin. In particular, amphiphilic block copolymers are such compounds as are disclosed in WO 2006/052725 A1, WO 2006/052726 A1, WO 2006/052727 A1, WO 2006/052728 A1, WO 2006/052729 A1, WO 2006/052730 A1, and WO 2005/097893 A1, the contents of which are incorporated here by reference.

Examples of block segments miscible in epoxy resin are especially polyethylene oxide, polypropylene oxide, poly(ethylene oxide-co-propylene oxide) and poly(ethylene oxide-ran-propylene oxide) blocks, as well as mixtures thereof.

Examples of block segments immiscible in epoxy resin are firstly in particular polyether blocks synthesized from alkylene oxides having at least 4 C atoms, preferably butylene oxide, hexylene oxide, and/or dodecylene oxide. Particularly preferred as such polyether blocks are polybutylene oxide, polyhexylene oxide, and polydodecylene oxide blocks, as well as mixtures thereof.

Examples of block segments immiscible in epoxy resin are secondly polyethylene, polyethylenepropylene, polybutadiene, polyisoprene, polydimethylsiloxane, and polyalkylmethacrylate blocks and mixtures thereof.

In one embodiment, the amphiphilic block copolymer having at least one hydroxyl group is a block copolymer derived from ethylene oxide and/or propylene oxide as well as at least one other alkylene oxide with at least 4 C atoms, preferably from the group consisting of butylene oxide, hexylene oxide, and dodecylene oxide.

In a further preferred embodiment, the amphiphilic block copolymer having at least one hydroxyl group is selected from the group consisting of poly(isoprene-block-ethylene oxide) block copolymers (PI-b-PEO), poly(ethylenepropylene-b-ethylene oxide) block copolymers (PEP-b-PEO), poly(butadiene-b-ethylene oxide) block copolymers (PB-b-PEO), poly(isoprene-b-ethylene oxide-b-isoprene) block copolymers (PI-b-PEO-PI), poly(isoprene-b-ethylene oxide methylmethacrylate) block copolymers (PI-b-PEO-b-PMMA), and polyethylene oxide)-b-poly(ethylene-alt-propylene) block copolymers (PEO-PEP).

The amphiphilic block copolymers can be in particular diblock, triblock, or tetrablock copolymers. The multiblock copolymers, i.e., in particular triblock or tetrablock copolymers, can be linear or branched, and in particular can be star block copolymers.

Synthesis of amphiphilic block copolymers is known to the person skilled in the art, for example, from *Macromolecules* 29, 6994-7002 (1996) and *Macromolecules* 33, 9522-9534 (2000) and *J. Polym. Sci. Part B: Polym. Phys.* 45, 3338-3348 (2007), the disclosure of which is incorporated here by reference.

The amphiphilic block copolymer has at least one hydroxyl group. Depending on the synthesis method, the amphiphilic block copolymer can have one or more hydroxyl groups.

For example, if polymerization of alkene oxides is initiated by methanol and stopped by acid, an amphiphilic block copolymer with one hydroxyl group is formed.

On the other hand, if it is initiated by a diol, for example ethylene glycol, an amphiphilic block copolymer with two hydroxyl groups is formed.

If alcohols with three, four, or even more hydroxyl groups are used as initiators, amphiphilic block copolymers are accordingly formed with three, four, or even more hydroxyl groups.

For example, the synthesis can be carried out in a sequential synthesis process in which first of all the first monomer, for example butylene oxide, is polymerized with the help of an initiator, followed by addition of the second monomer, for example ethylene oxide, which is polymerized at the end of the polymer formed by the first monomer. In this way, for example, by using a monol as the initiator, an amphiphilic diblock copolymer poly(ethylene oxide)-b-poly(butylene oxide) (PEO-PBO) can be synthesized. Thus by using a diol, for example, an amphiphilic triblock copolymer poly(ethylene oxide)-b-poly(butylene oxide)-poly(ethylene oxide) (PEO-PBO-PEO) is formed.

Also a first monomer, for example butylene oxide, can be polymerized with the help of an initiator, followed by addition of a mixture of two or more monomers, for example a mixture of ethylene oxide and butylene oxide, which are polymerized at the end of the polymer formed by the first monomer. In this way, for example, an amphiphilic block copolymer poly(ethylene oxide/butylene oxide)-polybutylene oxide)-poly(ethylene oxide/butylene oxide) (PEO/BO-PBO-PEO/BO) can be synthesized.

In addition to at least one amphiphilic block copolymer having at least one hydroxyl group, at least one more compound with at least two NCO-reactive groups can be used. Such a compound having at least two NCO-reactive groups is in particular polymers $Q_{PM}$ having terminal amino, thiol, or hydroxyl groups; and/or optionally substituted polyphenols $Q_{PP}$.

Particularly suitable polymers $Q_{PM}$ having terminal amino, thiol, or hydroxyl groups are polymers $Q_{PM}$ having two or three terminal amino, thiol, or hydroxyl groups.

The polymers $Q_{PM}$ advantageously have a weight per equivalent of 300-6000, in particular 600-4000, preferably 700-2200 g/equivalent of NCO-reactive groups.

Suitable polymers $Q_{PM}$ are polyols, for example, the following commercially available polyols or any mixtures thereof:

Polyoxyalkylene polyols, also called polyether polyols or oligoetherols, which are polymerization products of ethylene oxide, 1,2-propylene oxide, 1,2- or 2,3-butylene oxide, oxetane, tetrahydrofuran or mixtures thereof, optionally polymerized using an initiator molecule with two or more active hydrogen atoms such as, for example, water, ammonia, or compounds with more than one OH or NH groups such as, for example, 1,2-ethanediol, 1,2- and 1,3-propanediol, neopentyl glycol, diethylene glycol, triethylene glycol and polyethylene glycols, the isomeric dipropylene glycols, tripropylene glycols, and polypropylene glycols, the isomeric butanediols, pentanediols, hexanediols, heptanediols, octanediols, nonanediols, decanediols, and undecanediols, 1,3- and 1,4-cyclohexanedimethanol, bisphenol A, hydrogenated bisphenol A, 1,1,1-trimethylolethane, 1,1,1-trimethylolpropane, glycerol, aniline, as well as mixtures of the aforementioned compounds. Polyoxyalkylene polyols can be used that have a low degree of unsaturation (measured according to ASTM D-2849-69 and expressed in milliequivalents of unsaturation per gram polyol (meq/g)), synthesized for example using "double metal cyanide complex catalysts" (DMC catalysts), as well as polyoxyalkylene polyols with a higher degree of unsaturation, synthesized for example using anionic catalysts such as NaOH, KOH, CsOH, or alkali metal alkoxides.

Polyoxyalkylene diols or polyoxyalkylene triols, in particular polyoxypropylene diols or polyoxypropylene triols are especially suitable.

Especially suitable polyoxyalkylene diols and polyoxyalkylene triols are those having a degree of unsaturation below 0.02 meq/g and a molecular weight in the range from 1000 to 30 000 g/mol, as well as polyoxypropylene diols and triols having a molecular weight from 400 to 8000 g/mol.

Also especially suitable are "ethylene oxide-terminated" ("EO-endcapped", ethylene oxide-endcapped) polyoxypropylene polyols. The latter are special polyoxypropylene polyoxyethylene polyols that, for example, are obtained by further alkoxylating pure polyoxypropylene polyols, in particular polyoxypropylene diols and triols, after completion of polypropoxylation, with ethylene oxide, and thus they have primary hydroxyl groups.

Hydroxy-terminated polybutadiene polyols such as, for example, those that can be synthesized by polymerization of 1,3-butadiene and allyl alcohol or by oxidation of polybutadiene, as well as their hydrogenation products;

Styrene/acrylonitrile-grafted or acrylonitrile/methylmethacrylate-grafted polyether polyols, in particular those such as supplied, for example, by Elastogran under the name Lupranol®;

Polyester polyols, also called oligoesterols, synthesized for example from dihydric or trihydric alcohols such as, for example, 1,2-ethanediol, diethylene glycol, 1,2-propanediol, dipropylene glycol, 1,4-butanediol, 1,5-pentanediol, 1,6-hexanediol, neopentyl glycol, glycerol, 1,1,1-trimethylolpropane or mixtures of the aforementioned alcohols, reacted with organic dicarboxylic acids or their anhydrides or esters such as, for example, succinic acid, glutaric acid, adipic acid, suberic acid, sebacic acid, dodecanedicarboxylic acid, maleic acid, fumaric acid, phthalic acid, isophthalic acid, terephthalic acid, and hexahydrophthalic acid or mixtures of the aforementioned acids, as well as polyester polyols derived from lactones such as, for example, ε-caprolactone.

Polycarbonate polyols, as can be obtained, for example, by reaction of the above-indicated alcohols (used to synthesize the polyester polyols) with dialkyl carbonates, diaryl carbonates, or phosgene.

Polyacrylate and polymethacrylate polyols.

Polyhydroxy-functional fats and oils, for example natural fats and oils, in particular castor oil;

or polyols obtained by chemical modification of natural fats and oils ("oleochemical polyols"), for example epoxy polyesters or epoxy polyethers obtained by epoxidization of unsaturated oils followed by ring opening using carboxylic acids or alcohols, or polyols obtained by hydroformylation and hydrogenation of unsaturated oils; or polyols obtained from natural fats and oils by a degradation process such as alcoholysis or ozonolysis followed by chemical linkage, for example by transesterification or dimerization, of the thus obtained degradation products or derivatives thereof. Suitable degradation products of natural fats and oils are in particular fatty acids and fatty alcohols as well as fatty acid esters, in particular methyl esters (FAMES), which for example can be derivatized by hydroformylation and hydrogenation to form hydroxy fatty acid esters.

Polyhydrocarbon polyols, also called oligohydrocarbonols, such as, for example, polyhydroxy-functional ethylene/propylene, ethylene/butylene, or ethylene/propylene/diene copolymers, such as, for example, are manufactured by Kraton Polymers, or polyhydroxy-functional copolymers derived from dienes such as 1,3-butanediene or diene mixtures and vinyl monomers such as styrene, acrylonitrile, or isobutylene, or polyhydroxy-functional polybutadiene polyols such as, for example, those that are prepared by copolymerization of 1,3-butadiene and allyl alcohol and can also be hydrogenated.

Polyhydroxy-terminated acrylonitrile/butadiene copolymers, such as can be synthesized, for example, from epoxides or amino alcohols and carboxyl-terminated acrylonitrile/butadiene copolymers (commercially available under the name Hypro™ (formerly Hycar®) CTBN and CTBNX from Nanoresins AG, Germany, or Emerald Performance Materials LLC).

In addition to these indicated polyols, small amounts of low molecular weight dihydric or polyhydric alcohols can be used to make the polymer $Q_{PM}$, such as, for example, 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, and undecanediols, 1,3- and 1,4-cyclohexanedimethanol, hydrogenated bisphenol A, dimeric fatty alcohols, 1,1,1-trimethylolethane, 1,1,1-trimethylolpropane, glycerol, pentaerythritol, sugar alcohols such as xylitol, sorbitol, or mannitol, sugars such as sucrose, other alcohols with a higher number of OH groups, low molecular weight alkoxylation products of the aforementioned dihydric and polyhydric alcohols, as well as mixtures of the aforementioned alcohols.

Small amounts of polyols with average number of OH functional groups greater than 3, for example sugar polyols, can also be used.

The polymers $Q_{PM}$ are advantageously diols or higher-functional polyols with weights per OH equivalent of 300 to 6000 g/OH equivalent, in particular from 600 to 4000 g/OH equivalent, preferably 700-2200 g/OH equivalent. Also advantageous are polyols selected from the group consisting of polyethylene glycols, polypropylene glycols, polyethylene glycol/polypropylene glycol block copolymers, polybutylene glycols, hydroxyl-terminated polybutadienes, hydroxyl-terminated butadiene/acrylonitrile copolymers, hydroxyl-terminated synthetic rubbers, their hydrogenation products and mixtures of the aforementioned polyols.

For certain applications, suitable polymers $Q_{PM}$ are in particular hydroxyl group-containing polybutadienes or polyisoprenes or their partially or completely hydrogenated reaction products.

Furthermore, polymers $Q_{PM}$ can also be used that are difunctional or higher-functional amino-terminated polyethylene ethers, polypropylene ethers such as are commercially marketed, for example, under the name Jeffamine® by Huntsman, polybutylene ethers, polybutadienes, butadiene/acrylonitrile copolymers such as are marketed, for example, under the name Hypro™ (formerly Hycar®) ATBN from Nanoresins AG, Germany, or Emerald Performance Materials LLC, as well as other amino-terminated synthetic rubbers or mixtures of the indicated components.

It is also possible to use hydroxyl-terminated, mercapto-terminated, or amino group-terminated polysiloxanes as the polymers $Q_{PM}$.

The polymers $Q_{PM}$ can furthermore also undergo chain extension, such as can be done, by a method familiar to the person skilled in the art, by means of reaction of polyamines, polyols, and polyisocyanates, in particular diamines, diols, and diisocyanates.

Diols and/or diamines and diisocyanates are preferred in particular for extending the chain. Of course, it is clear to the person skilled in the art that higher-functional polyols such as, for example, trimethylolpropane or pentaerythritol, or higher-functional polyisocyanates such as isocyanurates of diisocyanates can also be used for extending the chain.

For polyurethane polymers PU1 in general and for chain-extended polyurethane polymers in particular, it is advantageous to make sure that the polymers do not have too high a viscosity, in particular if higher-functional compounds are used for extending the chain.

Preferred polymers $Q_{PM}$ are polyols with molecular weights between 600 and 6000 daltons, selected from the group consisting of polyethylene glycols, polypropylene glycols, polyethylene glycol/polypropylene glycol block polymers, polybutylene glycols, hydroxyl-terminated polybutadienes, hydroxyl-terminated butadiene/acrylonitrile copolymers as well as mixtures thereof.

Particularly preferred polymers $Q_{PM}$ are α,ω-dihydroxy polyalkylene glycols having $C_2$-$C_6$ alkylene groups or having mixed $C_2$-$C_6$ alkylene groups that are terminated by amino, thiol, or preferably hydroxyl groups. Polypropylene glycols or polybutylene glycols are especially preferred. Hydroxyl group-terminated polyoxybutylenes are also especially preferred.

Particularly suitable as the polyphenol $Q_{PP}$ are bisphenols, trisphenols, and tetraphenols. This means not only pure phenols but optionally also substituted phenols. The nature of the substitution can be quite diverse. In particular, this means a direct substitution on the aromatic ring to which the phenol OH group is bonded. By phenols furthermore is meant not only mononuclear aromatics but also polynuclear or condensed aromatics or heteroaromatics having phenol OH groups directly on the aromatic or heteroaromatic rings.

The reaction with isocyanates required to form the polyurethane polymer PU1 is affected inter alfa by the nature and position of such substituents.

Bisphenols and trisphenols are especially suitable. For example, suitable bisphenols or trisphenols are 1,4-dihydroxybenzene, 1,3-dihydroxybenzene, 1,2-dihydroxybenzene, 1,3-dihydroxytoluene, 3,5-dihydroxybenzoates, 2,2- bis(4-hydroxyphenyl)propane (=bisphenol A), bis(4-hydroxyphenyl)methane (=bisphenol F), bis(4-hydroxyphenyl)sulfone (=bisphenol S), naphthoresorcinol, dihydroxynaphthalene, dihydroxyanthraquinone, dihydroxybiphenyl, 3,3-bis(p-hydroxyphenyl)phthalide, 5,5-bis(4-hydroxyphenyl)hexahydro-4,7-methanoindane, phenolphthalein, fluorescein, 4,4'-[bis(hydroxyphenyl)-(1,3-phenylene)bis(1-methylethylidene)] (=bisphenol-M), 4,4'-bis(hydroxyphenyl)-(1,4-phenylene)bis(1-methylethylidene)] (=bisphenol P), 2,2'-diallyl bisphenol A, diphenols and dicresols synthesized by reacting phenols or cresols with diisopropylidene benzene, phloroglucinol, gallic acid esters, phenol or cresol novolacs with number of OH functional groups ranging from 2.0 to 3.5, as well as all isomers of the aforementioned compounds.

Preferred diphenols and dicresols synthesized by reaction of phenols or cresols with diisopropylidene benzene have a chemical structural formula as accordingly shown below for cresol as an example:

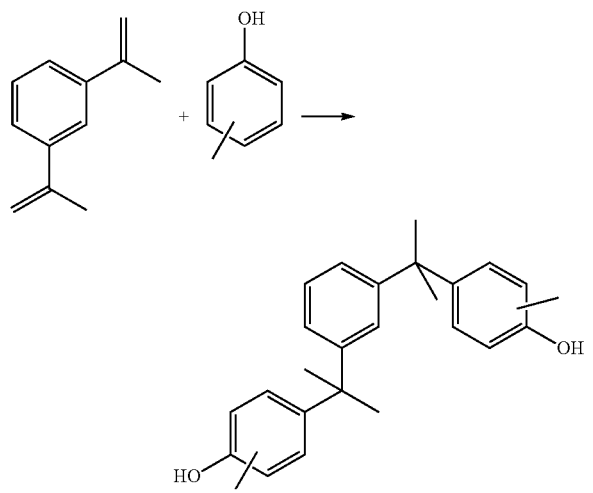

Low-volatility bisphenols are especially preferred. Bisphenol M, bisphenol S, and 2,2'-diallyl bisphenol A are considered as most preferred.

$Q_{PP}$ preferably has 2 or 3 phenol groups.

At least one polyisocyanate is used to synthesize the polyurethane polymer PU1. This polyisocyanate used for this purpose is in particular a diisocyanate or triisocyanate.

Suitable diisocyanates are, for example, aliphatic, cycloaliphatic, aromatic, or araliphatic diisocyanates, in particular commercially available products such as methylene diphenyl diisocyanate (MDI), hexamethylene diisocyanate (HDI), toluene diisocyanate (TDI), tolidine diisocyanate (TODI), isophorone diisocyanate (IPDI), trimethyl hexamethylene diisocyanate (TMDI), 2,5- or 2,6-bis(isocyanatomethyl)bicyclo[2.2.1]heptane, 1,5-naphthalene diisocyanate (NDI) dicyclohexylmethyl diisocyanate ($H_{12}MDI$), p-phenylene diisocyanate (PPDI), or m-tetramethylxylylene diisocyanate (TMXDI), etc., as well as dimers thereof. HDI, IPDI, MDI, or TDI are preferred.

Suitable triisocyanates are trimers or biurets of aliphatic, cycloaliphatic, aromatic, or araliphatic diisocyanates, in particular the isocyanurates and biurets of the diisocyanates described in the previous paragraph.

Of course, suitable mixtures of diisocyanates or triisocyanates can also be used.

The polyisocyanate HDI, IPDI, MDI, or TDI is preferred.

In one embodiment, the polyurethane polymer PU1 is synthesized from at least one diisocyanate or triisocyanate and, besides at least one amphiphilic block copolymer having at least one hydroxyl group, from a polymer $Q_{PM}$ having terminal amino, thiol, or hydroxyl groups. The polyurethane polymer PU1 is synthesized by a method familiar to the person skilled in the art of polyurethanes, in particular by using the diisocyanate or triisocyanate in stoichiometric excess relative to the amino, thiol, or hydroxyl groups of the polymer $Q_{PM}$ and the amphiphilic block copolymer having hydroxyl groups.

In a further embodiment, the polyurethane polymer PU1 is synthesized from at least one diisocyanate or triisocyanate and from, besides at least one amphiphilic block copolymer having at least one hydroxyl group, at least one optionally substituted polyphenol $Q_{PP}$. The polyurethane polymer PU1 is synthesized by a method familiar to the person skilled in the art of polyurethanes, in particular by using the diisocyanate or triisocyanate in stoichiometric excess relative to the phenol groups of the polyphenol $Q_{PP}$ and the amphiphilic block copolymer having hydroxyl groups.

In a further embodiment, the polyurethane polymer PU1 is synthesized from at least one diisocyanate or triisocyanate and from, besides at least one amphiphilic block copolymer having at least one hydroxyl group, a polymer $Q_{PM}$ having terminal amino, thiol, or hydroxyl groups as well as an optionally substituted polyphenol $Q_{PP}$.

Different options are available for synthesis of the polyurethane polymer PU1 from at least one polyisocyanate as well as at least one amphiphilic block copolymer having at least one hydroxyl group, and optionally from at least one polymer $Q_{PM}$ having terminal amino, thiol, or hydroxyl groups and/or at least one optionally substituted polyphenol $Q_{PP}$.

Depending on the type of sequence and the stoichiometry between the polyisocyanate and the NCO-reactive compounds, the exact sequence of the components in the polyurethane polymer PU1 formed can be selectively assembled. The polyurethane polymer PU1 has isocyanate groups and preferably has elastic properties and exhibits a glass transition temperature (Tg) below 0° C.

The polyurethane polymer PU1 can be reacted with at least one NCO-reactive compound to form reaction product PU2.

It was discovered that both polyurethane polymer PU1 and its reaction product PU2 can be excellently used as impact strength modifiers, in particular in epoxy resins. It has been shown that these impact strength modifiers appear to be uniformly distributed in the cured matrix, in particular the epoxy matrix, and even small amounts are enough to quite considerably improve the impact strength of the matrix. These impact strength modifiers independently develop a morphology during curing because of phase separation between the epoxy resin and the impact strength modifier(s), and depending on the amphiphilic copolymer used, the morphology is spheroidal, vermicular, or vesicular (blister-like). The scale of these separate phases in particular is in the nanometer region.

Compounds having OH, SH, NH, $NH_2$ as the NCO-reactive groups are particularly suitable as the NCO-reactive compound for the reaction to form reaction product PU2.

In an especially preferred embodiment, reaction product PU2 has formula (I).

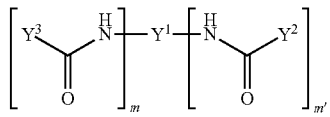

Here $Y^1$ stands for a linear or branched polyurethane polymer PU1 terminated by m+m' isocyanate groups, after removal of all terminal isocyanate groups.

Furthermore, $Y^2$ each independently stands here for a blocking group which is cleaved at a temperature above 100° C.

Furthermore, $Y^3$ each independently stands for a group of formula (I').

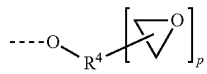

Here $R^4$ stands for an aliphatic, cycloaliphatic, aromatic, or araliphatic epoxy residue containing a primary or secondary hydroxyl group, after removal of the hydroxide and epoxide groups;

In this document, the use of the term "each independently" in connection with substituents, residues, or groups means that substituents, residues, or groups having the same designation can appear at the same time in the same molecule with different meanings.

Finally p=1, 2 or 3 and m and m' each stand for numbers between 0 and 8, provided that m+m' stands for a number from 1 to 8.

Possible blocking groups $Y^2$ in principle are quite diverse and the person skilled in the art is familiar with a large number of such blocking groups, for example from the review article by Douglas A. Wick in *Progress in Organic Coatings*, 36, 148-172 (1999) and in *Progress in Organic Coatings*, 41, 1-83 (2001).

Residue $Y^2$ in particular stands for residues selected from the group consisting of

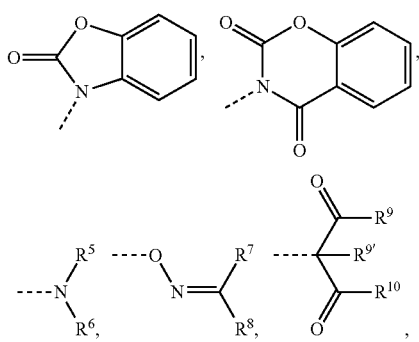

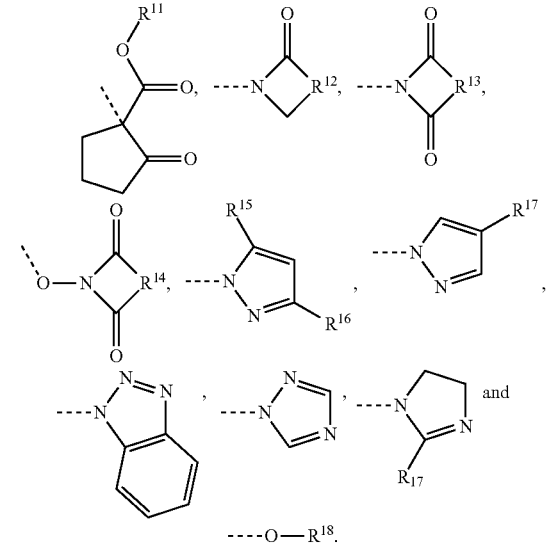

Here $R^5$, $R^6$, $R^7$, and $R^8$ each independently stands for an alkyl or cycloalkyl or aryl or aralkyl or arylalkyl group. Or $R^5$ together with $R^6$, or $R^7$ together with $R^8$, forms part of a 4- to 7-membered ring, which is optionally substituted.

Furthermore, $R^9$, $R^{9'}$, and $R^{10}$ each independently stands for an alkyl or aralkyl or aryl or arylalkyl group or for an alkyloxy or aryloxy or aralkyloxy group, and $R^{11}$ stands for an alkyl group.

Furthermore, $R^{12}$, $R^{13}$, and $R^{14}$ each independently stands for an alkylene group with 2 to 5 C atoms, which optionally has double bonds or is substituted, or for a phenylene group or for a hydrogenated phenylene group.

$R^{15}$, $R^{16}$, and $R^{17}$ each independently stands for H or for an alkyl group or for an aryl group or an aralkyl group and $R^{18}$ stands for an aralkyl group or for a mononuclear or polynuclear substituted or unsubstituted aromatic group, which optionally has aromatic hydroxyl groups.

The dashed lines in the formulas in this document in each case represent bonding between the respective substituents and the corresponding molecular moiety.

Phenols or bisphenols, after removal of an hydroxyl group, are in particular firstly to be considered as $R^{18}$. Phenol, cardanol (3-pentadecenylphenol (from cashew nutshell oil)), nonylphenol, diallyl bisphenol A, phenols reacted with styrene or dicyclopentadiene, bisphenol A, and bisphenol F should be mentioned in particular as examples of such phenols and bisphenols.

Hydroxybenzyl alcohol and benzyl alcohol, after removal of an hydroxyl group, are in particular secondly to be considered as $R^{18}$.

If $R^5$, $R^6$, $R^7$, $R^8$, $R^9$, $R^{9'}$, $R^{10}$, $R^{11}$, $R^{15}$, $R^{16}$ or $R^{17}$ stands for an alkyl group, the latter is in particular a linear or branched $C_1$-$C_{20}$ alkyl group.

If $R^5$, $R^6$, $R^7$, $R^8$, $R^9$, $R^{9'}$, $R^{10}$, $R^{15}$, $R^{16}$, $R^{17}$, or $R^{18}$ stands for an aralkyl group, the latter group is in particular an aromatic group bonded through methylene, in particular a benzyl group.

The residues $R^5$ and/or $R^6$ stand in particular for methyl or ethyl.

If $R^5$, $R^6$, $R^7$, $R^8$, $R^9$, $R^{9'}$, or $R^{10}$ stands for an alkylaryl group, the latter group is in particular a $C_1$-$C_{20}$ alkyl group bonded through phenylene such as, for example, tolyl or xylyl.

$Y^2$ in particular is a residue selected from the group consisting of

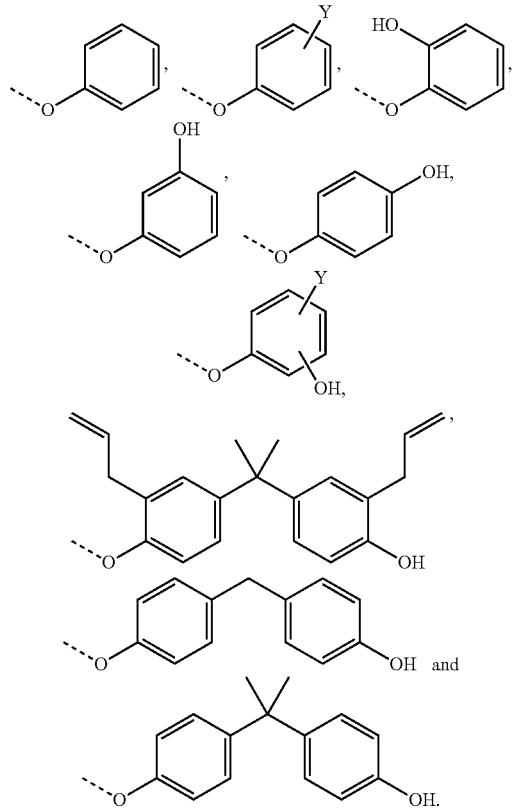

Here Y stands for a saturated or olefinic unsaturated hydrocarbon residue with 1 to 20 C atoms, in particular with 1 to 15 C atoms.

Different residues $Y^2$ and/or $Y^3$ may be present in the impact strength modifier of formula (I). When different residues $Y^2$ are present, it is advantageous if blocking groups $Y^2$ have clearly different deblocking temperatures. It is particularly advantageous if the difference between the deblocking temperatures for the $Y^2$ involved is at least 20° C., preferably at least 30° C. This makes it possible to devise multistep crosslinking processes, which opens up a multitude of possibilities for adhesives.

It is furthermore advantageous if different end groups are present in the impact strength modifier of formula (I), i.e., in particular that the m are different from 0 or that, as shown above, they belong to different groups. For example, it is advantageous firstly to use hydroxyl-functional epoxides of formula (I') and phenols or secondly to use phenols and oxazolinones as blocking agents. Of course, all other combinations of the described blocking agents as well as ternary or quaternary mixtures of blocking agents are also conceivable.

An impact strength modifier PU2 of formula (I) is synthesized from an isocyanate group-containing impact strength modifier PU1 of formula (III) [and?] the NCO-reactive compounds $Y^2$—H and/or $Y^3$—H.

(III)

To form "asymmetrically" blocked impact strength modifiers of formula (I), i.e., when neither m nor m' is equal to 0, or when different residues $Y^2$ or $Y^3$ are present in the same molecule, such a reaction of isocyanate group-containing polyurethane polymer PU1 is achieved either with a mixture of different $Y^2$—H and/or $Y^3$—H or else a sequential reaction can occur via an intermediate of formula (IVa) or (IVb).

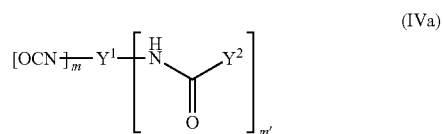

(IVa)

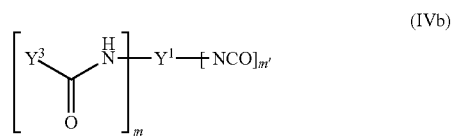

(IVb)

In a second step, then this NCO group-containing intermediate of formula (IVa) reacts with $Y^3$H, or this NCO group-containing intermediate of formula (IVb) reacts with $Y^2$H, to form reaction product PU2 of formula (I). This sequential reaction has the advantage that the reaction can be better controlled, so that formation of symmetric adducts (blocked "the same") is reduced. This is then particularly advantageous if the NCO reactivities of compounds $Y^2$—H and $Y^3$—H are very different.

To form "symmetrically" blocked impact strength modifiers of formula (I), i.e., when m or m' is equal to 0 and the residues $Y^2$ or $Y^3$ involved are the same, the isocyanate group-containing polyurethane polymer PU1 is reacted with $Y^2$—H or $Y^3$—H.

In a preferred embodiment, in which $Y^3$ stands for the group of formula (I'), the corresponding reaction of polyurethane polymer PU1, having formula (III), occurs with a monohydroxy) epoxide compound of formula (V).

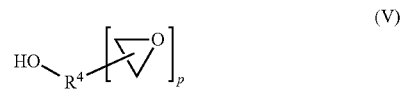

(V)

The monohydroxyl epoxy compound of formula (V) has 1, 2, or 3 epoxy groups. The hydroxyl group of this monohydroxyl epoxy compound (V) can be a primary or a secondary hydroxyl group.

Such monohydroxyl epoxy compounds can, for example, be produced by reaction of polyols with epichlorohydrin. Depending on how the reaction is carried out, when polyfunctional alcohols are reacted with epichlorohydrin, the corresponding monohydroxyl epoxy compounds are also formed as byproducts in different concentrations. The latter can be isolated by means of conventional separation operations. Generally, however, it is sufficient to use the product mixture obtained in the polyol glycidylization reaction, consisting of the polyol reacted completely and partially to form the glycidyl ether. Examples of such hydroxyl-containing epoxides are butanediol monoglycidyl ethers (present in butanediol diglycidyl ethers), hexanediol monoglycidyl ethers (present in hexanediol diglycidyl ethers), cyclohexanedimethanol glycidyl ethers, trimethylolpropane diglycidyl ethers (present as a mixture in trimethylolpropane triglycidyl ethers), glycerol diglycidyl ethers (present as a mixture in glycerol triglycidyl ethers), pentaerythritol triglycidyl ethers (present as a mixture in pentaerythritol tetraglycidyl ethers). It is preferable to use trimethylolpropane diglycidyl ether, which occurs in a relatively high proportion in conventionally synthesized trimethylolpropane triglycidyl ether.

However, other similar hydroxyl-containing epoxides can also be used, in particular glycidyl, 3-glycidyloxybenzyl alcohol, or hydroxymethyl cyclohexene oxide. Also preferred is the β-hydroxy ether of formula (IX), which is present in a proportion up to 15% in commercially available liquid epoxy resins, synthesized from bisphenol A (R=CH$_3$) and epichlorohydrin, as well as the corresponding β-hydroxy ethers of formula (IX), which are formed when bisphenol F (R=H) or the mixture of bisphenol A and bisphenol F is reacted with epichlorohydrin.

The impact strength modifier which is an isocyanate group-containing polyurethane polymer PU1, or which is a reaction product PU2 between this polyurethane product PU1 and at least one NCO-reactive compound, advantageously has elastic properties and is furthermore advantageously soluble or dispersible in liquid epoxy resins.

A further aspect of the present invention is a one-component heat-curing epoxy resin composition, which contains at least one epoxy resin A with more than one epoxy group per molecule on the average;

at least one curing agent B for epoxy resins which is activated by elevated temperature; plus

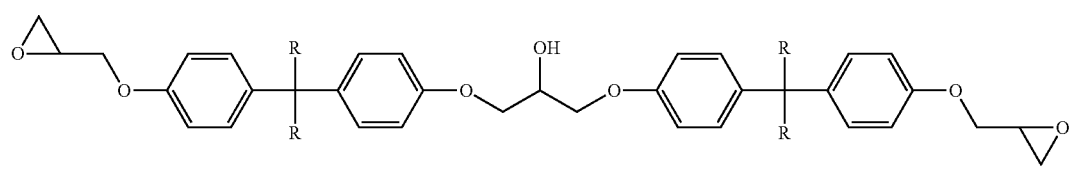

(IX)

Also preferred are distillation residues produced during manufacture of high-purity distilled liquid epoxy resins. Such distillation residues have an hydroxyl-containing epoxide concentration one to three times higher than in commercially available undistilled liquid epoxy resins. Furthermore, very different epoxides with a β-hydroxy ether group, synthesized by reaction of (poly)epoxides with a substoichiometric amount of monofunctional nucleophiles such as carboxylic acids, phenols, thiols, or secondary amines, can also be used.

The free primary or secondary OH functional group of the monohydroxyl epoxy compound of formula (V) allows for at least one impact strength modifier PU1 or PU2 described in detail above.

The epoxy resin A with more than one epoxy group per molecule on the average is preferably a liquid epoxy resin or a solid epoxy resin. The term "solid epoxy resin" is very familiar to the person skilled in the art of epoxides, and is used in contrast to "liquid epoxy resins." The glass transition temperature of solid resins is above room temperature, i.e., at room temperature they can be broken up into free-flowing particles.

Preferred solid epoxy resins have formula (X):

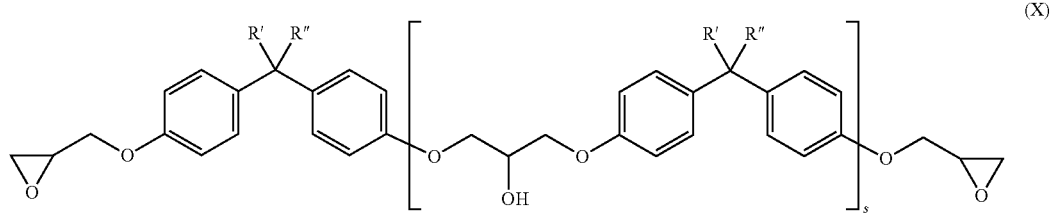

(X)

efficient reaction with terminal isocyanate groups of prepolymers without needing to use unusual excesses of the epoxide component.

For reaction of polyurethane prepolymers PU1 of formula (III), completely stoichiometric amounts of Y$^3$H, in particular of the monohydroxyl epoxy compound of formula (V), and Y$^2$H can be used. If a sequential reaction is carried out to form an intermediate of formula (IVa) or (IVb), it can be advantageous to use a stoichiometric excess of the compound Y$^3$H or Y$^2$H used in the second step, in order to make sure that all the NCO groups are reacted.

Here the substituents R' and R" each independently stand for either H or CH$_3$. Furthermore, the subscript s stands for a number>1.5, in particular a number from 2 to 12.

Such solid epoxy resins are commercially available, for example, from Dow or Huntsman or Hexion.

Compounds of formula (X) with a subscript s between 1 and 1.5 are called semisolid epoxy resins by the person skilled in the art. For the present invention, here they are also considered as solid resins. However, epoxy resins in the narrower sense are preferred, i.e., for which the subscript s has a value>1.5.

Preferred liquid epoxy resins have formula (XI):

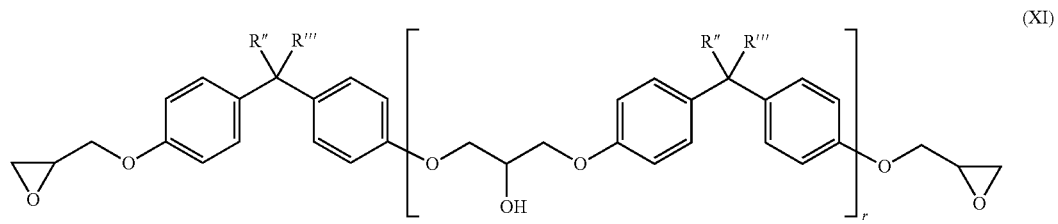

Here the substituents R" and R'" each independently stand for either H or CH$_3$. Furthermore, the subscript r stands for a number from 0 to 1. The subscript r preferably stands for a number less than 0.2.

These compounds are therefore preferably diglycidyl ether of bisphenol A (DGEBA), diglycidyl ether of bisphenol F, as well as diglycidyl ether of bisphenol A/F (the designation "A/F" here refers to a mixture of acetone and formaldehyde used as the starting material in its manufacture). Such liquid resins are available, for example, as Araldite® GY 250, Araldite® PY 304, Araldite® GY 282 (Huntsman), or D.E.R.™ 331, or D.E.R.™ 330 (Dow), or Epikote 828 (flexion).

Furthermore, "novolacs" are suitable as epoxy resin A. These have in particular the following formula:

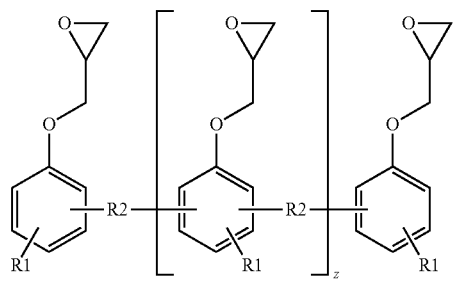

where R2=

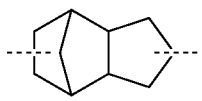

or CH$_2$,
R1=H or methyl and z=0 to 7.

Here these can be in particular phenol or cresol novolacs (R2=CH$_2$).

Such epoxy resins are commercially available under the trade names EPN or ECN as well as Tactix®556 from Huntsman or as the D.E.N.™ product line from Dow Chemical.

Epoxy resin A preferably is a liquid epoxy resin of formula (XI). In another even more preferred embodiment, the heat-curing epoxy resin composition contains at least one liquid epoxy resin of formula (XI) as well as at least one solid epoxy resin of formula (X).

The proportion of epoxy resin A is preferably 10-85 wt. %, in particular 15-70 wt. %, preferably 15-60 wt. %, based on the weight of the composition.

The proportion of impact strength modifier PU1 or PU2 is preferably 1-45 wt. %, in particular 3-30 wt. %, based on the weight of the composition.

The composition according to the invention additionally contains at least one curing agent B for epoxy resins which is activated at elevated temperature. Here the curing agent is preferably selected from the group consisting of dicyanodiamide, guanamines, guanidines, aminoguanidines, and derivatives thereof. Catalytically effective curing agents can also be used, such as substituted ureas such as, for example, 3-(3-chloro-4-methylphenyl)-1,1-dimethylurea (chlortoluron) or phenyl dimethylureas, in particular p-chlorophenyl-N,N-dimethylurea (monuron), 3-phenyl-1,1-dimethylurea (fenuron), or 3,4-dichlorophenyl-N,N-dimethylurea (diuron). Compounds in the class of imidazoles and amine complexes can also be used.

Curing agent B is preferably a curing agent selected from the group consisting of dicyanodiamide, guanamines, guanidines, aminoguanidines, and derivatives thereof; substituted ureas, in particular 3-(3-chloro-4-methylphenyl)-1,1-dimethylurea (chlortoluron) or phenyl dimethylureas, in particular p-chlorophenyl-N,N-dimethylurea (monuron), 3-phenyl-1,1-dimethylurea (fenuron), 3,4-dichlorophenyl-N,N-dimethylurea (diuron), N,N-dimethylurea as well as imidazoles, imidazole salts, and amine complexes.

Dicyanodiamide is particularly preferred as curing agent B.

The total proportion of curing agent B is advantageously 1-10 wt. %, preferably 2-8 wt. %, based on the weight of the total composition.

In addition, the heat-curing epoxy resin composition can contain a thixotropic agent C based on a urea derivative. The urea derivative is in particular a reaction product between an aromatic monomeric diisocyanate and an aliphatic amine compound. It is also quite possible to react more than one different monomeric diisocyanate with one or more aliphatic amine compounds, or to react one monomeric diisocyanate with more than one aliphatic amine compounds. The reaction product of 4,4'-diphenylmethylene diisocyanate (MDI) and butylamine has proven to be particularly advantageous.

The urea derivative is preferably present in a carrier. The carrier can be a plasticizer, in particular a phthalate or an adipate, preferably a diisodecylphthalate (DIDP) or dioctyladipate (DOA). The carrier can also be a non-diffusing carrier. This is preferred in order to ensure the least possible migration of the unreacted components after curing. Blocked polyurethane prepolymers are preferred as the non-diffusing carrier.

Preparation of Such Preferred Urea Derivatives and Carriers is Described in detail in the patent application EP 1 152 019 A1. The carrier is advantageously a blocked polyurethane prepolymer, in particular obtained by reaction of a trifunctional polyether polyol with IPDI, followed by blocking of the terminal isocyanate groups by ε-caprolactam.

The total proportion of thixotropic agent C is advantageously 0-40 wt. %, preferably 5-25% wt. %, based on the weight of the total composition.

The ratio of the weight of the urea derivative to the weight of the optionally present carrier is preferably 2:98 to 50:50, in particular 5:95-25:75.

It has furthermore been shown that it is especially advantageous if the heat-curing one-component epoxy resin composition additionally contains, besides the impact strength modifier PU1 or PU2 described above, at least one other impact strength modifier D.

The additional impact strength modifiers D can be solid or liquid.

In one embodiment, this impact strength modifier D is a liquid rubber D1 which is an acrylonitrile/butadiene copolymer terminated by carboxyl groups or epoxy groups, or is a derivative thereof. Such liquid rubbers are commercially available, for example, under the name Hypro™ (formerly Hycar®) CTBN and CTBNX and ETBN from Nanoresins AG, Germany or Emerald Performance Materials LLC. Suitable derivatives are in particular elastomer-modified prepolymers having epoxy groups, such as are commercially marketed as the Polydis® product line, preferably from the Polydis® 36xx product line, by the Struktol Company (Schill & Seilacher Group, Germany) or as the Albipox product line (Nanoresins, Germany).

In a further embodiment, the impact strength modifier D is a polyacrylate liquid rubber D2 that is completely miscible with liquid epoxy resins, and only separates into microdroplets during curing of the epoxy resin matrix. Such polyacrylate liquid rubbers are available, for example, under the name 20208-XPA from Rohm and Haas.

It is clear to the person skilled in the art that mixtures of liquid rubbers can of course be used, in particular mixtures of carboxyl-terminated or epoxy-terminated acrylonitrile/butadiene copolymers or derivatives thereof with epoxy-terminated polyurethane prepolymers.

In a further embodiment, the impact strength modifier D is a solid impact strength modifier which is an organic ion-exchanged layered mineral.

The ion-exchanged layered mineral DE1 can be either a cation-exchanged layered mineral DE1c or an anion-exchanged layered mineral DE1a.

The cation-exchanged layered mineral DE1c here is obtained from a layered mineral DE1', in which at least some of the cations have been exchanged by organic cations. Examples of such cation-exchanged layered minerals DE1c are in particular those which are mentioned in U.S. Pat. No. 5,707,439 or in U.S. Pat. No. 6,197,849. The method for preparation of these cation-exchanged layered minerals DE1c is also described in those patents. The layered mineral DE1' is preferably a sheet silicate. The layered mineral DE1' is particularly preferably a phyllosilicate as described in U.S. Pat. No. 6,197,849, Column 2, Line 38 to Column 3, Line 5, in particular a bentonite. Layered minerals DE1' such as kaolinite or a montmorillonite or a hectorite or an illite have been shown to be especially suitable.

At least some of the cations of the layered mineral DE1' are replaced by organic cations. Examples of such cations are n-octylammonium, trimethyldodecylammonium, dimethyldodecylammonium, or bis(hydroxyethyl)octadecylammonium or similar derivatives of amines that can be obtained from natural fats and oils; or guanidinium cations or amidinium cations; or cations of N-substituted derivatives of pyrrolidine, piperidine, piperazine, morpholine, thiomorpholine; or cations of 1,4-diazobicyclo[2.2.2]octane (DABCO) and 1-azobicyclo[2.2.2]octane; or cations of N-substituted derivatives of pyridine, pyrrole, imidazole, oxazole, pyrimidine, quinoline, isoquinoline, pyrazine, indole, benzimidazole, benzoxazole, thiazole, phenazine, and 2,2'-bipyridine. Furthermore, cyclic amidinium cations are suitable, in particular those such as are disclosed in U.S. Pat. No. 6,197,849 in Column 3, Line 6 to Column 4, Line 67. Compared with linear ammonium compounds, cyclic ammonium compounds are distinguished by elevated thermal stability, since thermal Hofmann degradation cannot occur with them.

Preferred cation-exchanged layered minerals DE1c are familiar to the person skilled in the art under the term organoclay or nanoclay, and are commercially available, for example, under the group names Tixogel® or Nanofil® (Süd-chemie), Cloisite® (Southern Clay Products), or Nanomer® (Nanocor, Inc.), or Garamite® (Rockwood).

The anion-exchanged layered mineral DE1a here is obtained from a layered mineral DE1" in which at least some of the anions have been exchanged by organic anions. An example of such an anion-exchanged layered mineral DE1a is a hydrotalcite DE1" in which at least some of the interlayer carbonate anions have been exchanged by organic anions.

It is also quite possible for the composition to simultaneously contain a cation-exchanged layered mineral DE1c and an anion-exchanged layered mineral DE1a.

In a further embodiment, the impact strength modifier D is a solid impact strength modifier which is a block copolymer DE2. The block copolymer DE2 is obtained from an anionic or controlled free-radical polymerization of methacrylic acid ester with at least one other monomer having an olefinic double bond. Particularly preferred as a monomer having an olefinic double bond is one in which the double bond is conjugated directly with a hetero atom or with at least one other double bond. Particularly suitable monomers are selected from the group including styrene, butadiene, acrylonitrile, and vinyl acetate. Acrylate/styrene/acrylic acid (ASA) copolymers, available, for example, under the name GELOY 1020 from GE Plastics, are preferred.

Especially preferred block copolymers DE2 are block copolymers derived from methacrylic acid methyl ester, styrene, and butadiene.

Such block copolymers are available, for example, as triblock copolymers under the group name SBM from Arkema.

In a further embodiment, the impact strength modifier D is a core/shell polymer DE3. Core/shell polymers consist of an elastic core polymer and a rigid shell polymer. Particularly suitable core/shell polymers consist of a core made from elastic acrylate or butadiene polymer which is enclosed in a rigid shell made from a rigid thermoplastic polymer. This core/shell structure is either formed spontaneously through separation of a block copolymer or is determined by latex polymerization or suspension polymerization followed by grafting. Preferred core/shell polymers are "MBS polymers," which are commercially available under the trade names Clearstrength™ from Atofina, Paraloid™ from Rohm and Haas, or F-351™ from Zeon.

Especially preferred are core/shell polymer particles that are already in the form of dried polymer latex. Examples are GENIOPERL M23A from Wacker with a polysiloxane core and an acrylate shell, radiation crosslinked rubber particles of the NEP series manufactured by Eliokem, or Nanoprene from Lanxess or Paraloid EXL from Rohm and Haas.

Other comparable examples of core/shell polymers are sold under the name Albidur™ by Nanoresins AG, Germany.

Nanoscale silicates in an epoxy matrix are also suitable, such as are sold under the trade name Nonopox [sic, should be Nanopox] from Nanoresins AG, Germany.

In a further embodiment, the impact strength modifier D is a reaction product DE4 between carboxylated solid nitrile rubber and excess epoxy resin.

Especially suitable as the impact strength modifier D optionally present in the composition are impact strength modifiers which correspond to the already described impact strength modifier of formula (I) but which are not based on an hydroxyl group-containing amphiphilic block copolymer but rather are based on a polymer $Q_{PM}$ with terminal amino, thiol, or hydroxyl groups as well as derived from an optionally substituted polyphenol $Q_{PP}$, as have already been disclosed for preparation of the polyurethane polymer (PU1).

Especially suitable as the impact strength modifier D optionally present in the composition are any of those disclosed in the following articles or patents, whose contents are incorporated here by reference: EP 0 308 664 A1, in particular formula (I), especially page 5, Line 14 to page 13, Line 24; EP 0 338 985 A1, EP 0 353 190 A1, WO 00/20483 A1, in particular formula (I), especially page 8, Line 18 to page 12, Line 2; WO 01/94492 A1, in particular the reaction products denoted as D) and E), especially page 10, Line 15 to page 14, line 22; WO 03/078163 A1, in particular the acrylate-terminated polyurethane resin denoted as B), especially page 14, Line 6 to page 14, Line 35; WO 2005/007766 A1, in particular formula (I) or (II), especially page 4, Line 5 to page 11 up to Line 20; EP 1 728 825 A1, in particular formula (I), especially page 3, line 21 to page 4 up to Line 47; WO 2006/052726 A1, in particular the amphiphilic block copolymer denoted as b), especially page 6, Line 17 to page 9, Line 10; WO 2006/052729 A1, in particular the amphiphilic block copolymer denoted as b), especially page 6, Line 25 to page 10, Line 2; T. J. Hermel-Davidock et al., *J. Polym. Sci. Part B: Polym. Phys.*, 45, 3338-3348 (2007), in particular the ambiphilic block copolymers, especially page 3339, 2nd column to page 3341, 2nd column; WO 2004/055092 A1, in particular formula (I), especially page 7, Line 28 to page 13 up to Line 15; WO 2005/007720 A1, in particular formula (I), especially page 8, Line 1 to page 17 up to Line 10; WO 2007/020266 A1, in particular formula (I), especially page 3, Line 1 to page 11 up to Line 6, as well as DE-A-2 123 033, US 2008/0076886 A1, WO 2008/016889, and WO 2007/025007.

It has been shown that advantageously more than one impact strength modifier is present in the composition, in particular also more than one impact strength modifier D.

The proportion of impact strength modifier D is advantageously used in an amount of 1-35 wt. %, in particular 1-25 wt. %, based on the weight of the composition.

In a further preferred embodiment, the composition in addition contains at least one filler F. Here the filler is preferably mica, talc, kaolin, wollastonite, feldspar, syenite, chlorite, bentonite, montmorillonite, calcium carbonate (precipitated or ground), dolomite, quartz, silicic acids (pyrogenic or precipitated), cristobalite, calcium oxide, aluminum hydroxide, magnesium oxide, hollow ceramic spheres, hollow glass spheres, hollow organic spheres, glass spheres, colored pigments. As the Filler F, we mean both organic coated and uncoated commercially available forms familiar to the person skilled in the art.

Another example is the functionalized alumoxanes, for example as described in U.S. Pat. No. 6,322,890.

The total proportion of total filler F is advantageously 3-50 wt. %, preferably 5-35 wt. %, in particular 5-25 wt. %, based on the weight of the total composition.

In a further preferred embodiment, the composition contains a physical or chemical blowing agent, as is available, for example, under the trade name Expancel™ from Akzo Nobel, or Celogen™ from Chemtura. The proportion of the blowing agent is advantageously 0.1-3 wt.-%, based on the weight of the composition.

In another preferred embodiment, the composition in addition contains at least one epoxy group-containing reactive diluent G. These reactive diluents G are in particular:

Glycidyl ether of monofunctional saturated or unsaturated, branched or unbranched, cyclic or open-chain $C_4$-$C_{30}$ alcohols, in particular selected from the group consisting of butyl glycidyl ether, hexyl glycidyl ether, 2-ethylhexyl glycidyl ether, allyl glycidyl ether, tetrahydrofurfuryl glycidyl ether and furfuryl glycidyl ether, and trimethoxysilyl glycidyl ether.

Glycidyl ethers of difunctional saturated or unsaturated, branched or unbranched, cyclic or open-chain $C_2$-$C_{30}$ alcohols, in particular selected from the group consisting of ethylene glycol glycidyl ether, butanediol glycidyl ether, hexanediol glycidyl ether, octanediol glycidyl ether, cyclohexane dimethanol diglycidyl ether, and neopentyl glycol diglycidyl ether.

Glycidyl ethers of trifunctional or polyfunctional, saturated or unsaturated, branched or unbranched, cyclic or open-chain alcohols such as epoxidized castor oil, epoxidized trimethylolpropane, epoxidized pentaerythrol, or polyglycidyl ethers of aliphatic polyols such as sorbitol, glycerol, or trimethylolpropane.

Glycidyl ethers of phenol compounds and aniline compounds, in particular selected from the group consisting of phenyl glycidyl ether, cresyl glycidyl ether, p-tert-butyl phenyl glycidyl ether, nonylphenyl glycidyl ether, 3-n-pentadecenyl glycidyl ether (from cashew nutshell oil), N,N-diglycidyl aniline, and p-aminophenyl triglycidyl [ether].

Epoxidized amines such as N,N-diglycidyl cyclohexylamine.

Epoxidized monocarboxylic acids or dicarboxylic acids, in particular selected from the group consisting of neodecanoic acid glycidyl ester, methacrylic acid glycidyl ester, benzoic acid glycidyl ester, phthalic acid diglycidyl ester, tetra- and hexahydrophthalic acid diglycidyl ester, and diglycidyl esters of dimeric fatty acids, as well as terephthalic acid glycidyl ester and trimellitic acid glycidyl ester.

Epoxidized difunctional or trifunctional, low molecular weight or high molecular weight polyether polyols, in particular polyethylene glycol diglycidyl ether or polypropylene glycol diglycidyl ether.

Hexanediol diglycidyl ether, cresyl glycidyl ether, p-tert-butylphenyl glycidyl ether, polypropylene glycol diglycidyl ether, and polyethylene glycol diglycidyl ether are especially preferred.

The total proportion of epoxy group-containing reactive diluent G is advantageously 0.1-20 wt. %, preferably 1-8 wt. %, based on the weight of the total composition.

The composition can include other components, in particular catalysts, stabilizers, in particular heat and/or light stabilizers, thixotropic agents, plasticizers, solvents, mineral or organic fillers, blowing agents, dyes and pigments, corrosion inhibitors, surfactants, defoamers, and adhesion promoters.

Suitable plasticizers are in particular phenyl alkylsulfonic acid esters or N-butyl benzenesulfonamide, such as are commercially available as Mesamoll® or Dellatol BBS from Bayer.

Suitable stabilizers are in particular optionally substituted phenols such as BHT or Wingstay® T (Elikem), sterically hindered amines, or N-oxyl compounds such as TEMPO (Evonik)

It has been shown that the heat-curing epoxy resin compositions described are especially suitable as one-component adhesives. Such a one-component adhesive has broad applications. Here heat-curing one-component adhesives can be realized in particular that are distinguished by high impact strength both at elevated temperatures and especially at low temperatures, in particular between 0° C. and −40° C. Such adhesives are needed for bonding heat-stable materials. "Heat-stable materials" means materials which for a cure temperature of 100° C.-220° C., preferably 120° C.-200° C., are shape-stable at least during the cure time. Here the heat-stable materials in particular are metals and plastics such as ABS, polyimide, polyphenylene ethers, composite materials such as SMC, glass fiber reinforced unsaturated polyesters, epoxy or acrylate composites. A preferred use is when at least one material is a metal. A particularly preferred use is bonding of identical or different metals, in particular in bodyshells in the automobile industry. Preferred metals are especially steel, in particular electrogalvanized steel, hot-dip galvanized steel, lubricated steel, Bonazinc-coated steel, and subsequently phosphatized steel as well as aluminum, in particular the types commonly used in automotive assembly.

Using an adhesive based on a heat-curing composition according to the invention, it is possible to achieve the desired combination of high crash resistance and both high and low operating temperature.

Such an adhesive in particular is first brought into contact with the materials to be bonded at a temperature between 10° C. and 80° C., in particular between 10° C. and 60° C., and is subsequently cured at a temperature of typically 100° C.-220° C., preferably 120°-200° C.

A further aspect of the present invention relates to a method for bonding heat-stable substrates, including the following steps:
i) Application of a one-component heat-curing epoxy resin composition, as described in detail above, to the surface of a heat-stable substrate S1, in particular a metal;
ii) Bringing the applied heat-curing epoxy resin composition into contact with the surface of another heat-stable substrate S2, in particular a metal;
iii) Heating the epoxy resin composition to a temperature of 100° C. to 130° C., preferably 115° C. to 125° C.;
iv) Bringing substrates S1 and S2, and the heat-curing epoxy resin composition in contact with them, into contact with a wash liquid at a temperature between 20° C. and 100° C., in particular between 40° C. and 70° C.; preferably between 50° C. and 70° C.;
v) Heating the composition to a temperature of 140° C.-220° C., in particular 140° C.-200° C., preferably between 160° C. and 190° C.

Substrate S2 here consists of material which is the same as or different from substrate S1.

Such a method for bonding heat-stable materials results in a bonded article. Such an article is preferably a vehicle or a mounted part on a vehicle.

Of course, in addition to heat-curing adhesives, sealants or coatings can also be realized with a composition according to the invention. Furthermore, the compositions according to the invention are not only suitable for automobile assembly but are also suitable for other areas of application. We should especially mention related applications in assembly of means of transportation such as ships, trucks, buses, or track vehicles, or in assembly of consumer goods such as, for example, washing machines.

The materials bonded by means of a composition according to the invention are used at temperatures between typically 120° C. and −40° C., preferably between 100° C. and −40° C., in particular between 80° C. and −40° C.

Compositions can be formulated which typically have fracture energies, measured according to ISO 11343, higher than 5.0 J at 23° C. and higher than 2.0 J at −30° C. Compositions can be typically formulated which have fracture energies higher than 8.0 J at 23° C. and higher than 4.0 J at −30° C. Especially advantageous compositions have fracture energies higher than 10.0 J at 23° C. and higher than 9.0 J at −30° C.

An especially preferred use of the heat-curing epoxy resin composition according to the invention is its use as a heat-curing bodyshell adhesive in vehicle assembly.

A further aspect of the present invention relates to use of amphiphilic block copolymers having at least one hydroxyl group for synthesis of urethane group-containing impact strength modifiers. The amphiphilic block copolymers having at least one hydroxyl group as well as their use to synthesize urethane group-containing impact strength modifiers have already been described in detail above.

EXAMPLES

A few examples are given below which illustrate the invention further but do not limit the scope of the invention in any way. The raw materials used in the Examples are listed in Table 1.

TABLE 1

Raw materials used.

| Raw materials used | Supplier |
|---|---|
| Fortegra ™ 100 (hydroxyl group-containing amphiphilic block copolymer) | Dow Chemical |
| Isophorone diisocyanate (= IPDI) | Degussa-Huls |
| Hydroquinone monomethyl ether | Sigma-Aldrich |
| Poly-THF ® 2000 | BASF |
| Poly-THF ® 1800 | BASF |
| Liquiflex H | Krahn |
| Benzoxazolinone | Sigma-Aldrich |
| Cardolite ® NC-700 (cardanol) | Cardolite |
| D.E.R ™ 331 (bisphenol A diglycidyl ether) | Dow |
| Polypox R7 (t-butyl phenyl glycidyl ether) | UPPC |
| Dyhard ® 100SF dicyanodiamide (="dicy") | Alzchem |
| Acclaim ® 8200 N | Bayer Material Science |
| Hypro ™ CTBN 1300X13 | Nanoresins |
| D.E.R. 671 (solid resin) (epoxide equivalent weight 475-550 g/eq) | Dow |
| Jeffamine ® T-3000 | Huntsman |
| Jeffamine ® D-4000 | Huntsman |
| Jeffamine ® T-403 | Huntsman |
| N,N-Dimethylurea | Sigma-Aldrich |
| Desmophen ® 3060 BS (trifunctional polypropylene glycol) (OH equivalent weight = 1000 g/OH equivalent) | Bayer Material Science |
| Caradol ED 56-10 | Shell |
| Dynacoll ® 7250 | Evonik |
| 4,4'-Diphenylmethylene diisocyanate (=MDI) | Bayer |
| N-Butylamine | BASF |
| ε-Caprolactam | EMS Chemie |

Example of Preparation of a Monohydroxyl-Containing Epoxide MHE1

Trimethyloipropane glycidyl ether was synthesized according to the method in U.S. Pat. No. 5,668,227, Example 1, from trimethylolpropane and epichlorohydrin using tetramethylammonium chloride and sodium hydroxide solution. A yellowish product was obtained, with epoxide number 7.5 eg/kg and hydroxyl group content 1.8 eq/kg. From the HPLC/MS spectrum, it could be concluded that mainly a mixture of trimethylolpropane diglycidyl ether and trimethylolpropane triglycidyl ether was present.

Thixotropic Agent TM1

As an example of a thixotropic agent based on a urea derivative in a non-diffusing carrier, a thixotropic agent was synthesized according to patent application EP 1 152 019 A1 in a blocked polyurethane prepolymer with the above-indicated raw materials:

Carrier: Blocked Polyurethane Prepolymer PUP:

600.0 g of a polyether polyol (Desmophen 3060BS; 3000 dalton; OH value 57 mg/g KOH) was reacted, under vacuum with stirring at 90° C., with 140.0 g IPDI and 0.10 g dibutyltin dilaurate to form the isocyanate-terminated prepolymer. The reaction was run until the NCO content was constant at 3.41%, after 2.5 h (theoretical NCO content: 3.60%). Then the free isocyanate groups were blocked with 69.2 g caprolactam (2% excess) at 90° C. under vacuum, where an NCO content of <0.1% was achieved after 3 h.

Urea Derivative in Blocked Polyurethane Prepolymer:

Under nitrogen and with gentle heating, 68.7 g MDI flakes were melted in 181.3 g of the blocked prepolymer PUP described above. Then 40.1 g n-butylamine, dissolved in 219.9 g of the blocked prepolymer described above, was added dropwise over a two-hour period, under nitrogen and with rapid stirring. After addition of the amine solution was complete, the white paste was stirred for another 30 minutes. Then after cooling down, a soft white paste of a thixotropic agent TM1 was obtained which had a free isocyanate content of <0.1% (proportion of urea derivative, about 20%).

Preparation of Impact Strength Modifier PU2-1:

100 g of Fortegra™ 100 (OH value approximately 16 mg/g KOH) was dried for 30 minutes under vacuum at 105° C. After the temperature had been lowered to 90° C., 7.2 g IPDI and 0.04 g dibutyltin dilaurate were added. The reaction was run under vacuum at 90° C. until the NCO content was constant at 1.17%, after 2.5 h (calculated NCO content: 1.29%). Then 4.4 g hydroquinone monomethyl ether was added as a blocking agent. Stirring was continued at 115° C. under vacuum until the NCO content dropped below 0.1%, after 3.5 h.

Preparation of Impact Strength Modifier PU2-2:

100 g of Fortegra™ 1100 (OH value approximately 16 mg/g KOH) was dried for 30 minutes under vacuum at 105° C. After the temperature had been lowered to 90° C., 7.2 g IPDI and 0.04 g dibutyltin dilaurate were added. The reaction was run under vacuum at 90° C. until the NCO content was constant at 1.17%, after 2.5 h (calculated NCO content: 1.29%). Then 20.7 g of MHE1 (mixture of trimethylolpropane triglycidyl ether and trimethylolpropane diglycidyl ether) was added as a blocking agent. Stirring was continued at 100° C. under vacuum until the NCO content dropped below 0.1%, after 2.5 h.

Preparation of Impact Strength Modifier PU2-3:

40 g of Poly-THF 2000 (OH value approximately 57 mg/g KOH), 40 g of Fortegra™ 100 (OH value approximately 16 mg/g KOH), and 40 g of Liquiflex H (OH value approximately 46 mg/g KOH) were dried for 30 minutes under vacuum at 105° C. After the temperature had been lowered to 90° C., 19.2 g IPDI and 0.06 g dibutyltin dilaurate were added. The reaction was run under vacuum at 90° C. until, the NCO content was constant at 2.4%, after 2.5 h (calculated NCO content: 2.6%). Then 3.2 g benzoxazolinone and 3.0 g hydroquinone monomethyl ether were added. After 3 h of stirring at 120° C. under vacuum, 26.5 g of MHE1 (mixture of trimethylolpropane triglycidyl ether and trimethylolpropane diglycidyl ether) was added. Stirring was continued at 100° C. under vacuum until the NCO content dropped below 0.1%, after 2.5 h.

Preparation of Impact Strength Modifier PU-Ref1

150 g of Acclaim 8200N(OH value approximately 14.5 mg/g KOH) was dried for 30 minutes under vacuum at 105° C. After the temperature had been lowered to 90° C., 9.9 g IPDI and 0.05 g dibutyltin dilaurate were added. The reaction was run under vacuum at 90° C. until the NCO content was constant at 1.18%, after 2.5 h (calculated NCO content: 1.20%). Then 6.7 g hydroquinone monomethyl ether was added as a blocking agent. Stirring was continued at 115° C. under vacuum until the NCO content dropped below 0.1%, after 3.5 h.

Preparation of Impact Strength Modifier PU-Ref2

150 g of Acclaim 8200N(OH value approximately 14.5 mg/g KOH) was dried for 30 minutes under vacuum at 105° C. After the temperature had been lowered to 90° C., 9.9 g IPDI and 0.05 g dibutyltin dilaurate were added. The reaction was run under vacuum at 90° C. until the NCO content was constant at 1.18%, after 2.5 h (calculated NCO content: 1.20%). Then 31.2 g of MHE1 (mixture of trimethylolpropane triglycidyl ether and trimethylolpropane diglycidyl ether) was added as a blocking agent. Stirring was continued at 100° C. under vacuum until the NCO content dropped below 0.1%, after 2.5 h.

Preparation of Impact Strength Modifier PU-Ref3

150 g of Poly-THF 2000 (OH value 57 mg/g KOH) and 150 [g] of Liquiflex H (OH value 46 mg/g KOH) were dried for 30 minutes under vacuum at 105° C. After the temperature had been lowered to 90° C., 64.0 g IPDI and 0.13 g dibutyltin dilaurate were added. The reaction was run under vacuum at 90° C. until the NCO content was constant at 3.30%, after 2.5 h (calculated NCO content: 3.38%). Then 103.0 g of Cardolite NC-700 was added as a blocking agent. Stirring was continued at 105° C. under vacuum until the NCO content dropped below 0.1%, after 3.5 h.

Preparation of Impact Strength Modifier PU-Ref4

60 g of Poly-THF 2000 (OH value approximately 57 mg/g KOH) and 60 g of Liquiflex H(OH value approximately 46 mg/g KOH) were dried for 30 minutes under vacuum at 105° C.

After the temperature had been lowered to 90° C., 24.6 g IPDI and 0.06 g dibutyltin dilaurate were added. The reaction was run under vacuum at 90° C. until the NCO content was constant at 3.05%, after 2.5 h (calculated NCO content: 3.22%). Then 4.3 g benzoxazolinone and 3.9 g hydroquinone monomethyl ether were added. After 3 h of stirring at 120° C. under vacuum, 35.0 g of MHE1 (mixture of trimethylolpropane triglycidyl ether and trimethylolpropane diglycidyl ether) was added. Stirring was continued at 100° C. under vacuum until the NCO content dropped below 0.1%, after 2.5 h.

Preparation of Impact Strength Modifier PU-Ref5

108 g of Poly-THF 2000 (OH value approximately 57.0 mg/g KOH) and 72 g of Dynacoll 7250 (OH value 22 mg/g KOH) were dried for 30 minutes under vacuum at 105° C. After the temperature had been lowered to 90° C., 32.2 g IPDI and 0.06 g dibutyltin dilaurate were added. The reaction was run under vacuum at 90° C. until the NCO content was constant at 2.87%, after 2.5 h (calculated NCO content: 2.92%). Then 21.6 g hydroquinone monomethyl ether was added. Stirring was continued at 110° C. under vacuum until the NCO content dropped below 0.1%, after 3.5 h.

Preparation of Impact Strength Modifier SM1

90 g of Hypro™ CTBN 1300X13 (acid value approximately 29 mg/g KOH), 60 g of Hypro™ CTBN 1300×8 (acid value approximately 32 mg/g KOH) and 23.2 g of Araldite® GT7071 (epoxide equivalent weight (EEW) approximately 510 g/eq) were stirred together with 0.75 g triphenylphosphine and 0.38 g of BHT for 2 hours under vacuum at 140° C. Then 201.8 g of D.E.R. 354 was added, and stirring was continued for 2 h at 140° C. under vacuum. A viscous resin with epoxide content of approximately 2.8 eq/kg was obtained.

Preparation of Impact Strength Modifier SM2

318.0 g of Jeffamine T-3000 and 30.4 g maleic anhydride were stirred for 2 h under nitrogen at 120° C. Then 802 g D.E.R. 331 plus 2.9 g triphenylphosphine were added, and stirring was continued at 110° C. under vacuum until a constant epoxide content was achieved.

A viscous resin with epoxide content of approximately 3.5 eq/kg was obtained after approximately 2 h.

Preparation of Impact Strength Modifier SM3

200.0 g (approximately 0.4 eq epoxide) of D.E.R. 671 and 75.0 g (approximately 0.4 eq epoxide) of D.E.R. 331 were stirred for 15 minutes at 120° C. under vacuum, until a homogeneous solution was formed. Then 230.0 g (approximately 0.23 eq NH) of Jeffamine D-4000 plus 0.5 g (approximately 0.007 eq NH) of Jeffamine T-403 were added. After 3 h of stirring under vacuum at 120° C. and 1 h at 130° C., a clear, viscous resin was obtained with calculated epoxide content of approximately 1.13 eq/kg (EEW=approximately 890).

Preparation of Impact Strength Modifier SM4

160 g of Poly-THF 1800 (OH value 62.3 mg/g KOH), 110 g of Liquiflex H(OH value 46 mg/g KOH), and 130 g of Caradol ED 56-10 (OH value 56 mg/g KOH) were dried for 30 minutes under vacuum at 105° C. After the temperature had been lowered to 90° C., 92.5 g IPDI and 0.08 g dibutyltin dilaurate were added. The reaction was run under vacuum at 90° C. until the NCO content was constant at 3.60%, after 2.5 h (calculated NCO content: 3.62%). Then 257.8 g of MHE1 (mixture of trimethylolpropane triglycidyl ether and trimethylolpropane diglycidyl ether) was added, and the reaction was continued at 90° C. under vacuum until the NCO content dropped below 0.1%, after 3 h.

Preparation of Impact Strength Modifier SM5

Under vacuum and with stirring at 110° C., 123.9 g of a dimeric fatty acid plus 71.3 g of bis(4-hydroxyphenyl)sulfone (Clariant) were reacted for 5 hours with 658 g of a liquid DGEBA epoxy resin with epoxide content of 5.45 eq/kg, until a constant epoxide concentration of 2.82 eq/kg was achieved. After the end of the reaction, an additional 118.2 g of liquid DGEBA epoxy resin was added to the reaction mixture.

Preparation of an Adduct of Hexamethylene Diisocyanate with Dimethylamine AD1

50 mL tetrahydrofuran and 20.0 g of an approximately 33% dimethylamine solution in ethanol (approximately 146 mmol amine) were weighed out in a 100 mL two-necked flask with a reflux condenser.

Then over a 30 minute period, 10.0 g hexamethylene diisocyanate (approximately 119 mmol NCO) was slowly added dropwise; the reaction was slightly exothermic and a white solid immediately precipitated. After 2 hours of stirring at ambient temperature, the suspension was filtered. It was washed 3× with 20 mL THF each time. The crude product obtained was dried for 3 h at 80° C. under vacuum. 12.3 g of a white powder was obtained.

Preparation of Adduct AD2

22.97 g (0.22 mol) diethylenetriamine was added dropwise with stirring to 102.6 g (0.68 mol) salicylic acid methyl ester. This mixture was stirred for 6 h at 140° C.; a white precipitate formed. After cooling down to 30° C., acetone was added and the white precipitate was filtered out. The residue was washed twice with acetone and then dried at 60° C. in the vacuum oven. Then an intermediate with melting point of approximately 150° C. was obtained. Then this was heated for 90 minutes at 160° C. in a drying cabinet under vacuum. The crude product was finely ground and treated again for one hour at 160° C. under vacuum. Approximately 47 g of a white powder with melting point of approximately 290° C. was obtained in this way.

Preparation of Compositions

The reference compositions Ref. 1-Ref. 13 as well as the compositions according to the invention 1 to 10 were prepared according to Tables 2 to 5. The components are respectively given in parts by weight. In particular it was made sure that the compositions each had the same amounts of epoxy groups as the corresponding Reference Example. In the Comparison Examples, which contain unreacted amphiphilic block copolymer (Fortegra™ 100) or polyol (Acclaim 8200N), for the corresponding Examples according to the invention the amount of the respective impact strength modifier according to the invention was selected so that they contained the same amounts of amphiphilic block copolymer as the starting material.

Test Methods:

Tensile Shear Strength (TSS) (DIN EN 1465)

The test pieces were prepared from the Example compositions described and with electrogalvanized DC04 steel (eloZn) of dimensions 100×25×1.5 mm or 100×25×0.8 mm, where the adhesion surface area was 25×10 mm with a layer thickness of 0.3 mm. They were cured for 30 min at 180° C. The pull rate was 10 mm/min.

Tensile Strength (TS) (DIN EN ISO 527)

An adhesive test sample was pressed between two pieces of teflon paper to a layer thickness of 2 mm. Then the adhesive was cured for 30 minutes at 180° C. The teflon paper was removed and the test pieces were hot-punched out according to the DIN standard. The test pieces were measured with a pull rate of 2 mm/min after 1 day of storage under the standard climate. The tensile strength was determined according to DIN EN ISO 527.

Impact/Peel Work (ISO 11343)

The test pieces were prepared from the Example compositions described and with electrogalvanized DC04 steel (eloZn) of dimensions 90×20×0.8 mm, where the adhesion surface area was 20×30 mm with a layer thickness of 0.3 mm. They were cured for 30 min at 180° C. The impact/peel work was measured respectively at room temperature and at −30° C. (minus 30° C.). The impact velocity was 2 m/s. The area under the measurement curve (from 25% to 90%, according to ISO 11343) is given as the fracture energy (FE) in joules.

Glass Transition Temperature ($T_g$)

The glass transition temperature was determined by DSC. A Mettler DSC822$^e$ was used for this purpose. 10-20 mg of each composition was weighed out in an aluminum crucible. After the test sample had been cured in the DSC for 30 min at 175° C., the test sample was cooled down to −20° C. (minus 20° C.) and then heated up to 150° C. at a heating rate of 10° C./min. The glass transition temperature was determined from the measured DSC curve using the DSC software.

The results of these tests are summarized in Tables 2 to 5.

TABLE 2

Compositions and results.

|  | 1 | Ref. 1 | Ref. 2 | 2 | Ref. 3 | Ref. 4 |
|---|---|---|---|---|---|---|
| D.E.R. ™ 331 | 45.0 | 45.0 | 45.0 | 42.0 | 42.0 | 42.0 |
| Polypox R7 | 3.0 | 3.0 | 3.0 | 3.0 | 3.0 | 3.0 |
| PU2-1 | 16.5 | | | | | |
| PU2-2 | | | | 18.0 | | |
| Fortegra ™ 100 | | 15.0 | | | | |
| PU2-Ref1 | | | 16.5 | | | |
| PU2-Ref2 | | | | | 18.0 | |
| Acclaim 8200 N | | | | | | 15.0 |
| dicy | 3.74 | 3.74 | 3.74 | 3.82 | 3.82 | 3.82 |
| N,N-dimethylurea | 0.2 | 0.2 | 0.2 | 0.2 | 0.2 | 0.2 |
| Filler mix | 19.0 | 19.0 | 19.0 | 19.0 | 19.0 | 19.0 |
| TSS [MPa] | 22.0 | 12.0 | 6.4 | 17.9 | 9.9 | 8.1 |
| FE[1] at 23° C. [J] | 9.6 | 0.3 | 1.6 | 5.1 | 1.6 | 0.2 |
| FE[1] at −30° C. [J] | 8.4 | 0.1 | 1.4 | 4.9 | 1.5 | 0.2 |
| Tg [° C.] | 129 | 128 | 127 | 126 | 132 | 131 |

[1]FE = fracture energy.

TABLE 3

Compositions and results.

|  | 3 | Ref. 5 | 4 | Ref. 6 | 5 | Ref. 7 | 6 | Ref. 8 |
|---|---|---|---|---|---|---|---|---|
| D.E.R. ™ 331 | 45.0 | 45.0 | 45.0 | 45.0 | 48.0 | 50.0 | 30.0 | 30.0 |
| Polypox R7 | 3.0 | 3.0 | 3.0 | 3.0 | 3.0 | 3.0 | 3.0 | 3.0 |
| PU2-1 | 80 | | 80 | | | | | |
| PU2-2 | | | | | 8.5 | | | |
| Fortegra ™ 100 | | 7.0 | | 7.0 | | 7.0 | | 7.0 |
| PU-Ref3 | | | | | 15.0 | 15.0 | | |
| Struktol 3614 | 15.0 | 15.0 | | | | | | |
| SM1 | | | 15.0 | 15.0 | | | | |
| SM2 | | | | | | | 30.0 | 30.0 |
| dicy | 4.41 | 4.41 | 4.41 | 4.41 | 4.14 | 4.14 | 4.09 | 4.09 |
| Filler mix | 19.0 | 19.0 | 19.0 | 19.0 | 19.0 | 19.0 | 19.0 | 19.0 |
| TS [MPa] | 43.1 | 32.3 | 33.1 | 32.0 | 30.1 | 17.0 | 37.4 | 31.8 |
| TSS [MPa] | 35.8 | 22.5 | 33.8 | 17.1 | 31.0 | 24.2 | 33.0 | 31.7 |
| FE[1] at 23° C. [J] | 8.6 | 0.2 | 8.8 | 0.2 | 9.9 | 4.9 | 8.1 | 4.2 |
| FE[1] at −30° C. [J] | 2.0 | 0.1 | 2.0 | 0.2 | 4.8 | 1.5 | 4.7 | 0.3 |
| Tg [° C.] | 128 | 130 | 130 | 132 | 110 | 109 | 130 | 130 |

[1]FE = fracture energy.

TABLE 4

Compositions and results.

|  | 7 | Ref. 9 | 8 | Ref. 10 | 9 | Ref. 11 |
|---|---|---|---|---|---|---|
| D.E.R. ™ 331 | 45.0 | 45.0 | 43.0 | 45.0 | 44.0 | 45.0 |
| Polypox R7 | 3.0 | 3.0 | 3.0 | 3.0 | 3.0 | 3.0 |
| PU2-1 | | | 9.0 | | 6.0 | |
| PU2-2 | | | 9.0 | | 6.0 | |
| PU2-3 | 24.0 | | | | | |
| Fortegra ™ 100 | | 7.0 | | 15.0 | | 10.0 |
| PU-Ref4 | | 15.0 | | | | |
| SM3 | | | | 10.0 | 10.0 | |
| SM4 | | | | | 10.0 | 10.0 |
| TM1 | | | | | 10.0 | 10.0 |
| dicy | 4.41 | 441 | 3.91 | 3.91 | 4.08 | 4.08 |
| N,N-dimethylurea | | | | 0.2 | 0.2 | |
| AD1 | 0.2 | 0.2 | | | 0.2 | 0.2 |
| Filler mix | 19.0 | 19.0 | 19.0 | 19.0 | 19.0 | 19.0 |
| TSS [MPa] | 31.3 | 21.9 | 19.1 | 8.0 | 24.1 | 9.8 |
| FE[1] at 23° C. [J] | 11.5 | 5.2 | 6.6 | 0.2 | 7.7 | 0.4 |
| FE[1] at −30° C. [J] | 9.2 | 2.8 | 7.1 | 0.2 | 7.0 | 0.2 |
| Tg [° C.] | 117 | 121 | 129 | 130 | 119 | 120 |

[1]FE = fracture energy.

TABLE 5

Compositions and results.

|  | 10 | Ref. 12 | Ref. 13 |
|---|---|---|---|
| D.E.R ™ 331 (DGEBA) (Dow) | 40.0 | 40.0 | 40.0 |
| D.E.R ™ 354 (DGEBF) (Dow) | 2.0 | 2.0 | 2.0 |
| Araldite GT7071 ("Type 1" solid epoxy resin) (Dow) | 2.0 | 2.0 | 2.0 |
| D.E.N. 431 (novolac) (Dow) | 2.0 | 2.0 | 2.0 |
| Cardura E10 P (Hexion) | 1.0 | 1.0 | 1.0 |
| Cardolite ® LITE 2513 HP (Cardolite) | 1.0 | 1.0 | 1.0 |
| Epikote 493 (Hexion) | 1.0 | 1.0 | 1.0 |
| PU2-1 | 3.5 | | |
| PU2-2 | 3.5 | | |
| Fortegra ™ 100 | | 6.0 | |
| PU-Ref3 | 2.0 | 2.0 | 2.0 |
| PU-Ref4 | 2.0 | 2.0 | 2.0 |
| PU-Ref5 | 2.0 | 2.0 | 2.0 |
| SM1 | 2.0 | 2.0 | 2.0 |
| SM2 | 2.0 | 2.0 | 2.0 |
| SM3 | 2.0 | 2.0 | 2.0 |
| SM4 | 2.0 | 2.0 | 2.0 |
| SM5 | 2.0 | 2.0 | 2.0 |
| Struktol ® 3614 (Schill&Seilacher) | 2.0 | 2.0 | 2.0 |
| Flexiblizer [sic, should be Flexibilizer] DY 965 (Huntsman) | 2.0 | 2.0 | 2.0 |
| Adeka EP-49-10N (Asahi Denka Kogyo K.K) | 2.0 | 2.0 | 2.0 |
| F-351 ™ (core/shell) (Nippon Zeon Chemicals) | 1.0 | 1.0 | 1.0 |
| Kane ACE MX-120 (Kaneka) | 1.0 | 1.0 | 1.0 |
| Eliokem NEP (Eliokem) | 1.0 | 1.0 | 1.0 |

TABLE 5-continued

Compositions and results.

| | 10 | Ref. 12 | Ref. 13 |
|---|---|---|---|
| Nanpox [sic, should be Nanopox] ® XP 220516 (Nanoresins) | 1.0 | 1.0 | 1.0 |
| MagSilica ® 50 (Evonik) | 0.2 | 0.2 | 0.2 |
| dicy | 4.9 | 4.9 | 4.9 |
| N,N-dimethylurea | 0.1 | 0.1 | 0.1 |
| AD1 | 0.1 | 0.1 | 0.1 |
| AD2 | 0.1 | 0.1 | 0.1 |
| Omicure ® BC-120 (CVC Specialty Chemicals) | 0.1 | 0.1 | 0.1 |
| Jayflex DIDP (plasticizer) (Exxon Mobil Chemicals) | 1.0 | 1.0 | 1.0 |
| Mesamoll ® II (plasticizer) (Lanxess) | 1.0 | 1.0 | 1.0 |
| Wingstay ® T (stabilizer) (Eliokem) | 0.5 | 0.5 | 0.5 |
| Surfinol ® 420 (surfactant) (Air Products) | 0.1 | 0.1 | 0.1 |
| EFKA ® 2720 (defoamer) (Ciba Specialty Chemicals) | 0.1 | 0.1 | 0.1 |
| Silquest ® A-187 (adhesion promoter) (GE Advanced Materials) | 0.1 | 0.1 | 0.1 |
| TM1 | 2.0 | 2.0 | 2.0 |
| Luvothix ® HT (thixotropic agent) (Lehmann&Voss) | 1.0 | 1.0 | 1.0 |
| Dynacoll ® 7330(Evonik) | 1.0 | 1.0 | 1.0 |
| Disperal ® 40 (nanoscale alumoxane) (Sasol) | 2.0 | 2.0 | 2.0 |
| Calcium oxide | 2.0 | 2.0 | 2.0 |
| Aerosil ® R202 (Evonik) | 4.0 | 4.0 | 4.0 |
| Wollastonite | 2.0 | 2.0 | 2.0 |
| Chalk | 2.0 | 2.0 | 2.0 |
| Talc | 0.5 | 0.5 | 0.5 |
| Mica | 0.5 | 0.5 | 0.5 |
| Garamite ® 1958 (Rockwood Specialties) | 0.5 | 0.5 | 0.5 |
| Chromophthal Red (Ciba Speciality Chemicals) | 0.1 | 0.1 | 0.1 |
| Carbon black | 0.1 | 0.1 | 0.1 |
| TSS [MPa] | 26.3 | 13.8 | 30.1 |
| FE[1] at 23° C. [J] | 7.2 | 0.9 | 5.6 |
| FE[1] at −30° C. [J] | 2.9 | 0.3 | 0.9 |
| Tg [° C.] | 104 | 108 | 106 |

[1]FE = fracture energy.

The invention claimed is:

1. Impact strength modifier comprising an isocyanate group-containing polyurethane polymer (PU1), which is synthesized from at least one polyisocyanate and at least one amphiphilic block copolymer having at least one hydroxyl group, and optionally at least one compound with at least two NCO— reactive groups, wherein the impact strength modifier has formula (I)

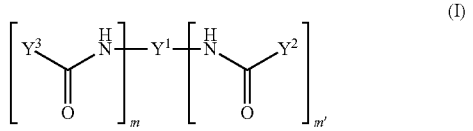

(I)

wherein $Y^1$ stands for a linear or branched polyurethane polymer PU1 terminated by m+m' isocyanate groups, after removal of all terminal isocyanate groups;

$Y^2$ each independently stands for a blocking group which is cleaved at a temperature above 100° C.;

$Y^3$ each independently stands for a group of formula (I')

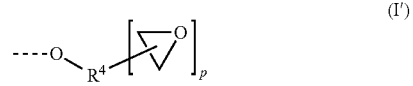

(I')

wherein $R^4$ stands for an aliphatic, cycloaliphatic, aromatic, or araliphatic epoxide containing a primary or secondary hydroxyl group, after removal of the hydroxy and epoxy groups;

p=1, 2, or 3 and m and m' each stand for numbers from 0 and 8, provided that m+m' stands for a number from 1 to 8, and wherein the amphiphilic block copolymer having at least one hydroxyl group is a block copolymer derived from ethylene oxide and/or propylene oxide as well as at least one other alkylene oxide with at least 4 C atoms.

2. Impact strength modifier as in claim 1, wherein $Y^2$ stands for a residue selected from the group consisting of

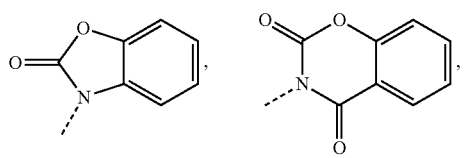

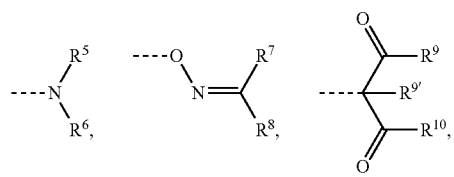

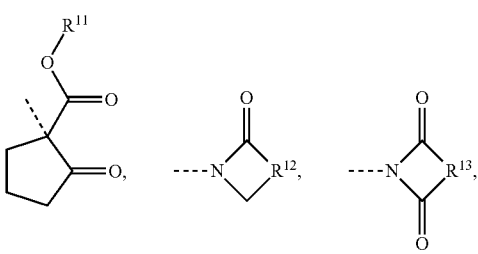

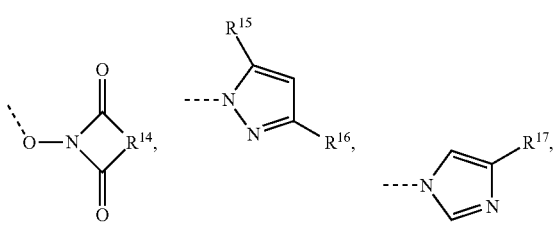

-continued

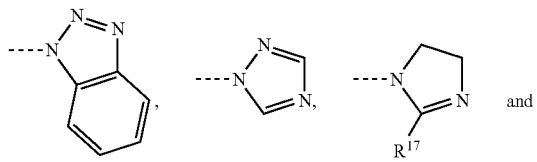

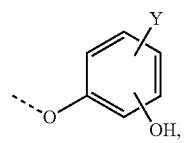

wherein
$R^5$, $R^6$, $R^7$ and $R^8$ each independently stands for an alkyl or cycloalkyl or aryl or aralkyl or arylalkyl group or $R^5$ together with $R^6$, or $R^7$ together with $R^8$, form a part of a 4- to 7-membered ring, which is optionally substituted;
$R^9$, $R^{9'}$, and $R^{10}$ each independently stands for an alkyl or aralkyl or aryl or arylalkyl group or for an alkyloxy or aryloxy or aralkyloxy group;
$R^{11}$ stands for an alkyl group;
$R^{12}$, $R^{13}$, and $R^{14}$ each independently stands for an alkylene group with 2 to 5 C atoms, which optionally has double bonds or is substituted, or for a phenylene group or for a hydrogenated phenylene group;
$R^{15}$, $R^{16}$, and $R^{17}$ each independently stands for H or for an alkyl group or for an aryl group or an aralkyl group; and
$R^{18}$ stands for an aralkyl group or for a mononuclear or polynuclear substituted or unsubstituted aromatic group, which optionally has aromatic hydroxyl groups.

3. Impact strength modifier as in claim 1, wherein $Y^2$ is selected from the group consisting of

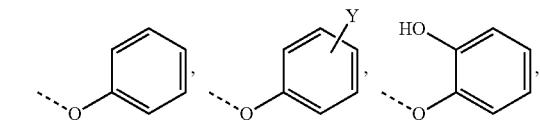

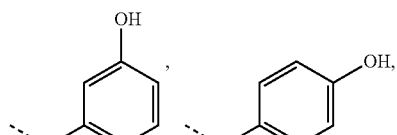

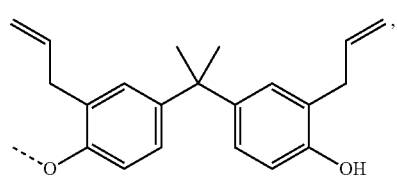

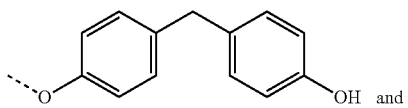

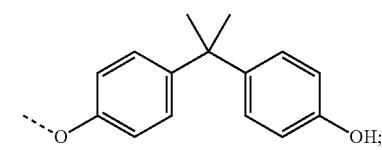

and Y stands for a saturated or olefinic unsaturated hydrocarbon residue with 1 to 20 C atoms.

4. Impact strength modifier as in claim 1, wherein $R^4$ is a trivalent residue of formula

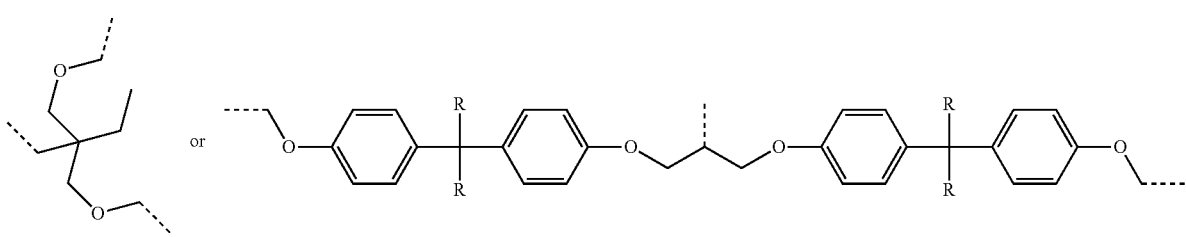

where R is methyl or H.

5. Impact strength modifier as in claim 1, wherein the polyisocyanate used for synthesis of the polyurethane polymer PU1 is a diisocyanate or triisocyanate.

6. A method of synthesizing the impact strength modifier according to claim 1, comprising mixing together at least one polyisocyanate and at least one amphiphilic block copolymer having at least one hydroxyl group.

* * * * *